United States Patent
Takahashi et al.

(10) Patent No.: US 10,520,309 B2
(45) Date of Patent: Dec. 31, 2019

(54) OBJECT RECOGNITION DEVICE, OBJECT RECOGNITION METHOD, EQUIPMENT CONTROL SYSTEM, AND DISTANCE IMAGE GENERATION DEVICE

(71) Applicant: Ricoh Company, Ltd., Tokyo (JP)

(72) Inventors: Sadao Takahashi, Kanagawa (JP); Hiroyoshi Sekiguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 106 days.

(21) Appl. No.: 15/854,461

(22) Filed: Dec. 26, 2017

(65) Prior Publication Data

US 2018/0120108 A1 May 3, 2018

Related U.S. Application Data

(63) Continuation of application No. PCT/JP2016/003129, filed on Jun. 29, 2016.

(30) Foreign Application Priority Data

| Jul. 2, 2015 | (JP) | 2015-133967 |
| Sep. 9, 2015 | (JP) | 2015-178002 |
| Apr. 26, 2016 | (JP) | 2016-088603 |

(51) Int. Cl.
*G06K 9/00* (2006.01)
*G01C 11/06* (2006.01)
(Continued)

(52) U.S. Cl.
CPC ............. *G01C 11/06* (2013.01); *G01C 3/06* (2013.01); *G06K 9/00805* (2013.01);
(Continued)

(58) Field of Classification Search
CPC combination set(s) only.
See application file for complete search history.

(56) References Cited

U.S. PATENT DOCUMENTS

| 6,366,691 B1 | 4/2002 | Sogawa |
| 2006/0029270 A1* | 2/2006 | Berestov ............. G06T 7/593 |
| | | 382/154 |

(Continued)

FOREIGN PATENT DOCUMENTS

| EP | 2 570 990 A1 | 3/2013 |
| EP | 2 860 695 A1 | 4/2015 |

(Continued)

OTHER PUBLICATIONS

International Search Report dated Oct. 4, 2016 in PCT/JP2016/003129 filed Jun. 29, 2016 (with Written Opinion).

(Continued)

*Primary Examiner* — Alex Kok S Liew
(74) *Attorney, Agent, or Firm* — Xsensus LLP

(57) ABSTRACT

According to one aspect of the present invention, an object recognition device for performing recognition processing on a distance image to recognize an object includes a determination unit, a changing unit, and a recognition processor. The determination unit is configured to determine a valid distance pixel forming the distance image and an invalid distance pixel not forming the distance image, based on a feature value of each pixel in a captured image. The changing unit is configured to change the invalid distance pixel near the valid distance pixel to a valid distance pixel. The recognition processor is configured to perform recognition processing on the distance image formed by the valid distance pixel determined by the determination unit and the valid distance pixel obtained by the changing unit to recognize the object.

20 Claims, 23 Drawing Sheets

(51) Int. Cl.
  *G06T 7/593* (2017.01)
  *G06K 9/03* (2006.01)
  *G01C 3/06* (2006.01)

(52) U.S. Cl.
  CPC .............. *G06K 9/036* (2013.01); *G06T 7/593* (2017.01); *G06T 2207/30252* (2013.01)

(56) References Cited

U.S. PATENT DOCUMENTS

| | | |
|---|---|---|
| 2007/0076984 A1 | 4/2007 | Takahashi et al. |
| 2007/0195070 A1 | 8/2007 | Takahashi et al. |
| 2007/0195370 A1 | 8/2007 | Suga et al. |
| 2009/0237491 A1 | 9/2009 | Saito |
| 2010/0231717 A1 | 9/2010 | Sasaki et al. |
| 2011/0050714 A1 | 3/2011 | Sekiguchi et al. |
| 2011/0075937 A1 | 3/2011 | Tate |
| 2012/0014590 A1 | 1/2012 | Martinez-Bauza et al. |
| 2013/0064443 A1 | 3/2013 | Schlosser et al. |
| 2013/0129224 A1* | 5/2013 | Katz .................. G06K 9/00201 382/199 |
| 2014/0294289 A1 | 10/2014 | Nakatani et al. |
| 2015/0178936 A1* | 6/2015 | Boisson .............. H04N 13/271 382/154 |
| 2015/0294160 A1 | 10/2015 | Takahashi et al. |
| 2015/0332103 A1 | 11/2015 | Yokota et al. |
| 2015/0334269 A1 | 11/2015 | Yokota et al. |
| 2015/0358610 A1 | 12/2015 | Takahashi et al. |
| 2016/0014406 A1 | 1/2016 | Takahashi et al. |
| 2016/0019429 A1 | 1/2016 | Ishigaki et al. |
| 2016/0131579 A1 | 5/2016 | Sekiguchi et al. |
| 2016/0261848 A1 | 9/2016 | Sekiguchi et al. |
| 2017/0098132 A1 | 4/2017 | Yokota et al. |

FOREIGN PATENT DOCUMENTS

| | | |
|---|---|---|
| JP | 11-351862 | 12/1999 |
| JP | 2001-082954 | 3/2001 |
| JP | 3287465 | 3/2002 |
| JP | 3562751 | 6/2004 |
| JP | 2008-065634 | 3/2008 |
| JP | 4248212 | 1/2009 |
| JP | 2009-110172 | 5/2009 |
| JP | 2013-045276 | 3/2013 |
| JP | 2013-164351 | 8/2013 |
| JP | 5409237 | 11/2013 |
| JP | 2013-250907 | 12/2013 |
| JP | 2015-011619 | 1/2015 |
| JP | 2015-179301 | 10/2015 |
| JP | 2016-001463 | 1/2016 |
| JP | 2016-166850 | 9/2016 |
| JP | 2017-021780 | 1/2017 |
| WO | WO 2011/163603 A1 | 12/2011 |

OTHER PUBLICATIONS

Extended European Search Report dated Jun. 6, 2018 in corresponding European Patent Application No. 16817477.9, 7 pages.

* cited by examiner

FIG.11
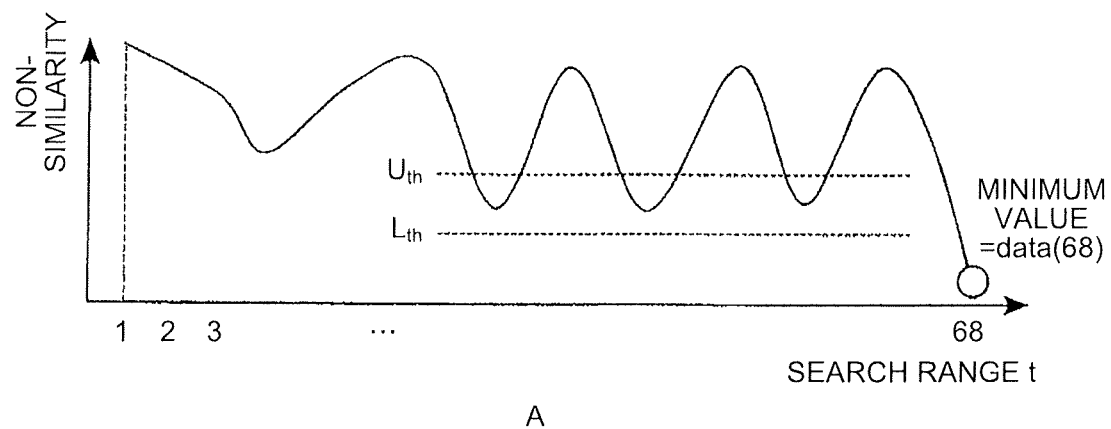
A
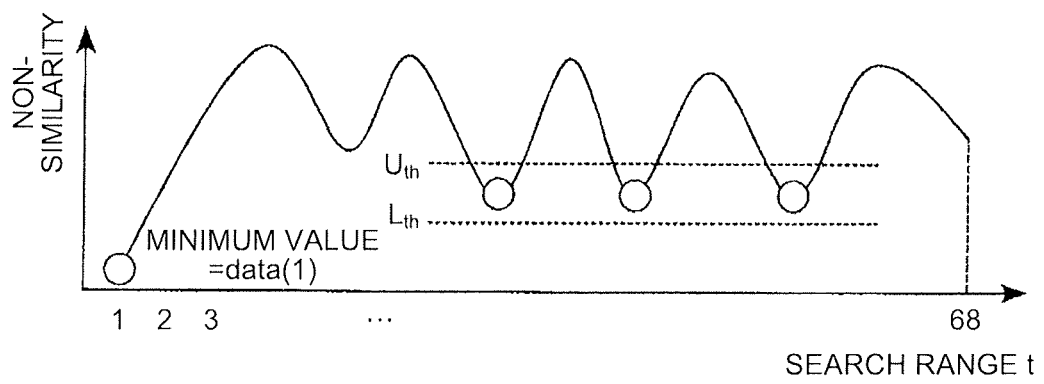
B

SEARCH RANGE t

SEARCH RANGE t

FIG.24

| REGION IN WHICH CORRECT DISPARITY IS OBTAINED | | | REGION IN WHICH ERRONEOUS MATCHING OCCURS DUE TO REPETITIVE PATTERN POSITIONED AT LONG DISTANCE | | | | | | | REGION IN WHICH CORRECT DISPARITY IS OBTAINED | | | | | | |
|---|---|---|---|---|---|---|---|---|---|---|---|---|---|---|---|---|
| EDGE | | | | | | | | | | | | | | | | |
| 1 | 0 | 0 | 0 | 0 | 1 | 0 | 1 | 0 | 1 | 0 | 0 | 0 | 1 | 0 | 0 | 1 |
| DISPARITY VALUE | | | | | | | | | | | | | | | | |
| 4 | 4 | 4 | 10 | 10 | 22 | 22 | 22 | 22 | 22 | 4 | 4 | 4 | 4 | 4 | 4 | 4 |
| DETERMINE "WHETHER IT IS VALID" | | | | | | | | | | | | | | | | |
| O | O | O | × | × | O | O | O | O | O | × | × | × | O | O | O | O |

FIG.25

| | REGION IN WHICH CORRECT DISPARITY IS OBTAINED | | | REGION IN WHICH ERRONEOUS MATCHING OCCURS DUE TO REPETITIVE PATTERN POSITIONED AT LONG DISTANCE | | | | | | | | REGION IN WHICH CORRECT DISPARITY IS OBTAINED | | | | | | |
|---|---|---|---|---|---|---|---|---|---|---|---|---|---|---|---|---|---|---|
| EDGE | 1 | 1 | 1 | 0 | 0 | 1 | 1 | 1 | 1 | 0 | 1 | 0 | 0 | 0 | 1 | 1 | 1 | 1 |
| DETERMINE "NO REPETITION" | 1 | 1 | 1 | 0 | 0 | 0 | 0 | 0 | 0 | 0 | 0 | 0 | 0 | 0 | 1 | 1 | 1 | 1 |
| DISPARITY VALUE | 4 | 4 | 4 | 10 | 10 | 22 | 22 | 22 | 22 | 22 | 22 | 4 | 4 | 4 | 4 | 4 | 4 | 4 |
| DETERMINE "WHETHER IT IS VALID" | ○ | ○ | ○ | × | × | × | × | × | × | × | × | ○ | ○ | ○ | ○ | ○ | ○ | ○ |

OBJECT RECOGNITION DEVICE, OBJECT RECOGNITION METHOD, EQUIPMENT CONTROL SYSTEM, AND DISTANCE IMAGE GENERATION DEVICE

CROSS-REFERENCE TO RELATED APPLICATIONS

The present application is a continuation application of International Application No. PCT/JP2016/003129, filed Jun. 29, 2016, which claims priority to Japanese Patent Applications No. 2015-133967, filed Jul. 2, 2015; No. 2015-178002, filed Sep. 9, 2015; and No. 2016-088603, filed Apr. 26, 2016. The contents of these applications are incorporated herein by reference in their entirety.

BACKGROUND OF THE INVENTION

1. Field of the Invention

The present invention relates to an object recognition device, an object recognition method, an equipment control system, and a distance image generation device.

2. Description of the Related Art

In recent years, known is a technique for detecting an object such as a person or an automobile rapidly by measuring distances with millimetric wave radar, laser radar, or a stereo camera, for example. For example, to detect three-dimensional position and size of an object such as a person or a preceding vehicle by measuring a distance with a stereo camera, a position of a road surface is detected after interpolating a disparity of the object, and the object being in contact with the road surface is detected. A detection output of such an object is used for automatic brake control, automatic steering wheel control, or the like.

To accurately detect the three-dimensional position and size of the object such as a person and a preceding vehicle with the stereo camera, a disparity in a horizontal direction needs to be detected. As a method for detecting a disparity, known are a block matching method and a sub-pixel interpolation method.

In the block matching method in the related art, a disparity of a portion having a virtually vertical edge or texture can be detected with high accuracy. However, in the block matching method in the related art, there is difficulty in detecting the disparity at a virtually horizontal edge. In the block matching method in the related art, even if the disparity can be detected, much noise is disadvantageously included therein.

A three-dimensional object such as a preceding vehicle is a box-shaped object, and can be regarded as a collection of perpendicular lines on the left and right ends and horizontal lines connecting the perpendicular lines on the left and right ends. It is hard to detect the disparity of this object except the perpendicular lines on both ends. This means that there is a valid disparity at a portion where a vertical edge is present.

In this case, the perpendicular lines are not recognized as one object, and erroneously recognized as two objects running side by side. A technique has been developed in which the perpendicular lines can be recognized as one object by interpolating the disparity. However, this technique has a problem in that there is difficulty in recognizing the object correctly because the disparity is interpolated between the automobile and another automobile running side by side, a nearby sign, and another three-dimensional object.

In a case of the technique disclosed in Japanese Unexamined Patent Publication No. 11-351862, disparities between the automobile and the other three-dimensional object are interpolated with the same value, so that the objects having different sizes are recognized. In a case of the technique disclosed in Japanese Unexamined Patent Publication No. 11-351862, the disparity always includes an error, so that interpolation cannot be made by interpolating the disparities of the same disparity value, and difficulty still arises in recognizing the object.

SUMMARY OF THE INVENTION

According to one aspect of the present invention, an object recognition device for performing recognition processing on a distance image to recognize an object includes a determination unit, a changing unit, and a recognition processor. The determination unit is configured to determine a valid distance pixel forming the distance image and an invalid distance pixel not forming the distance image, based on a feature value of each pixel in a captured image. The changing unit is configured to change the invalid distance pixel near the valid distance pixel to a valid distance pixel. The recognition processor is configured to perform recognition processing on the distance image formed by the valid distance pixel determined by the determination unit and the valid distance pixel obtained by the changing unit to recognize the object.

BRIEF DESCRIPTION OF THE DRAWINGS

FIG. 11 is a diagram for explaining minimum value processing and exception processing performed by the disparity arithmetic unit;

FIG. 24 is a diagram for explaining a conventional determination method that erroneously determines a pixel in which erroneous matching occurs to be a valid pixel; and FIG. 25 is a diagram for explaining the disparity image generator in the equipment control system according to the fourth embodiment that accurately detects the valid pixel to be output.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
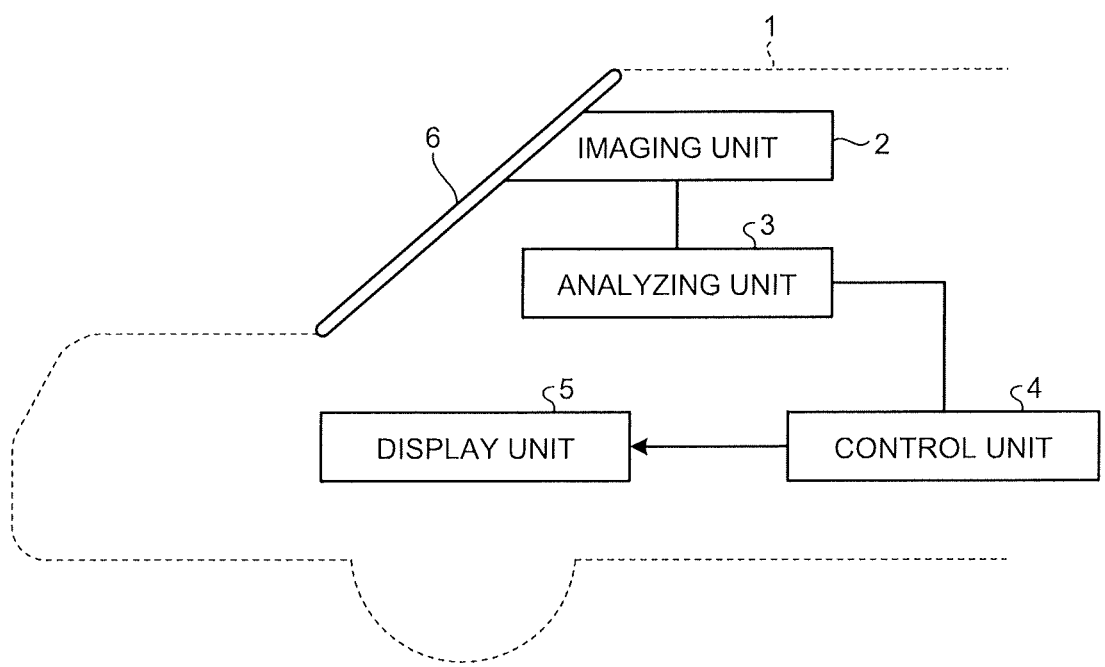
FIG. 1 is a schematic diagram illustrating a schematic configuration of an equipment control system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an object recognition device, an object recognition method, a computer-readable recording medium, an equipment control system, and a distance image generation device for generating a disparity image appropriate for recognizing an object.

In the present embodiment, it will be described the case where an image processing device according to the present invention is applied to an electronic whiteboard.

First Embodiment

FIG. 1 is a schematic diagram illustrating a schematic configuration of an equipment control system according to a first embodiment. As illustrated in FIG. 1, the equipment control system is disposed in a vehicle 1 such as an automobile as an example of equipment. The equipment control system includes an imaging unit 2, an analyzing unit 3, a control unit 4, and a display unit 5.

The imaging unit 2 is disposed near a room mirror on a windshield 6 of the vehicle 1, and takes an image of the vehicle 1 in a traveling direction, for example. Various pieces of data including image data obtained through an imaging operation of the imaging unit 2 are supplied to the analyzing unit 3. The analyzing unit 3 analyzes an object to be recognized such as a road surface on which the vehicle 1 is traveling, a vehicle preceding the vehicle 1, a pedestrian, and an obstacle based on the various pieces of data supplied from the imaging unit 2. The control unit 4 gives a warning and the like to a driver of the vehicle 1 via the display unit 5 based on an analysis result of the analyzing unit 3. The control unit 4 supports traveling by controlling various onboard devices, performing steering wheel control or brake control of the vehicle 1, for example, based on the analysis result.

Figure 2:
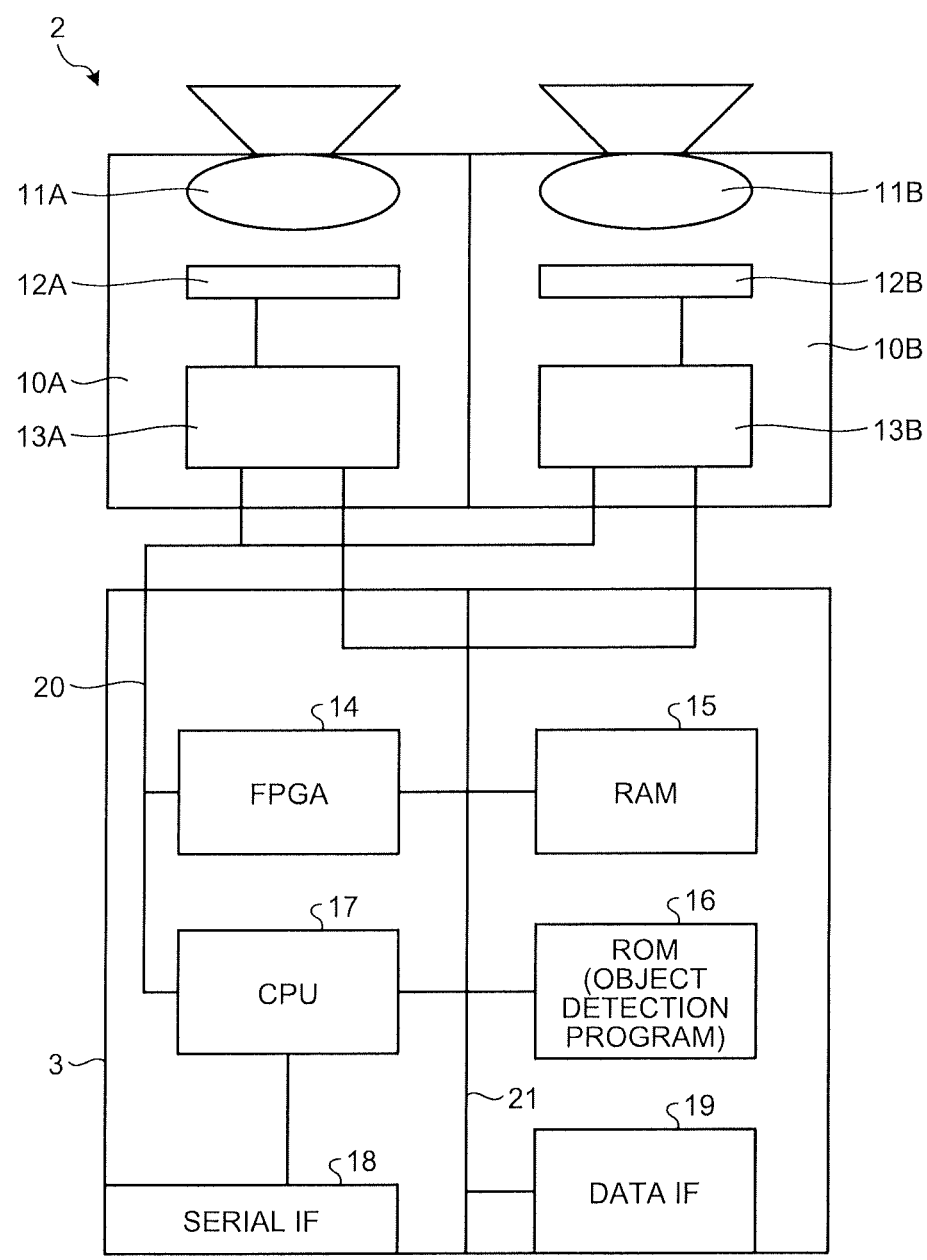
FIG. 2 is a block diagram illustrating a schematic configuration of an imaging unit and an analyzing unit disposed in the equipment control system according to the first embodiment.

FIG. 2 is a schematic block diagram of the imaging unit 2 and the analyzing unit 3. As illustrated in FIG. 2, the imaging unit 2 has a stereo camera configuration including two imaging units 10A and 10B, for example. The two imaging units 10A and 10B have the same configuration. Specifically, the imaging units 10A and 10B includes imaging lenses 11A and 11B, image sensors 12A and 12B in which light receiving elements are two-dimensionally arranged, and controllers 13A and 13B that drive the image sensors 12A and 12B to take an image.

The analyzing unit 3 is an example of an object recognition device, and includes a field-programmable gate array (FPGA) 14, a random access memory (RAM) 15, and a read only memory (ROM) 16. The analyzing unit 3 also includes a serial interface (serial IF) 18 and a data IF 19. The FPGA 14 to the data IF 19 are connected with each other via a data bus line 21 of the analyzing unit 3. The imaging unit 2 and the analyzing unit 3 are connected with each other via the data bus line 21 and a serial bus line 20.

The RAM 15 stores disparity image data and the like generated based on luminance image data supplied from the imaging unit 2. The ROM 16 stores an operation system and various programs such as an object detection program including a disparity image generation program.

The FPGA 14 operates in accordance with the disparity image generation program included in the object detection program. As described later in detail, the FPGA 14 causes one of captured images captured by the imaging units 10A and 10B to be a reference image, and causes the other one thereof to be a comparative image. The FPGA 14 calculates a position shift amount between a corresponding image portion on the reference image and a corresponding image portion on the comparative image, both corresponding to the same point in an imaging region, as a disparity value (disparity image data) of the corresponding image portion.

Specifically, in calculating the disparity from a stereo image captured by the imaging unit 2, the FPGA 14 previously calculates many disparities based on block matching for a pixel position having an edge and other portions. Thereafter, the disparity of the pixel having an edge is validated. When a difference between the validated disparity that has been validated and a validated disparity positioned nearby is equal to or smaller than a predetermined value, a disparity between the validated disparity that has been validated and the validated disparity positioned nearby is validated. "Validate" means to specify (or extract) the disparity as information used for processing of recognizing an object.

Thus, the equipment control system according to the first embodiment can appropriately generate disparity information of the preceding vehicle not only at a vehicle edge but also in the vehicle and other spaces. The vehicle 1 can be recognized as one object with correct size and distance, and the vehicle 1 can be prevented from being coupled with another object to be erroneously detected.

A CPU 17 operates based on the operation system stored in the ROM 16, and performs overall imaging control on the imaging units 10A and 10B. The CPU 17 loads the object detection program from the ROM 16, and performs various pieces of processing using the disparity image data written into the RAM 15. Specifically, based on the object detection program, the CPU 17 refers to controller area network (CAN) information such as vehicle speed, acceleration, a steering angle, and a yaw rate acquired from each sensor disposed in the vehicle 1 via the data IF 19, and performs processing of recognizing the object to be recognized such as a road surface, a guardrail, a vehicle, and a person, disparity calculation, calculation of a distance to the object to be recognized, and the like.

The CPU 17 supplies a processing result to the control unit 4 illustrated in FIG. 1 via the serial IF 18 or the data IF 19. The control unit 4 is an example of a control device, and performs, for example, brake control, vehicle speed control, and steering wheel control based on data as the processing result. The control unit 4 causes the display unit 5 to display a warning and the like based on the data as the processing result. This configuration can support driving of the vehicle 1 by the driver.

The following specifically describes an operation of generating the disparity image and an operation of recognizing the object to be recognized in the equipment control system according to the first embodiment.

First, the imaging units 10A and 10B of the imaging unit 2 constituting the stereo camera generate luminance image data. Specifically, when the imaging units 10A and 10B have color specifications, each of the imaging units 10A and 10B performs an arithmetic operation of Y=0.3R+0.59G+0.11B. Due to this, color luminance conversion processing is performed for generating a luminance (Y) signal from each signal of RGB (red, green, and blue).

Each of the imaging units 10A and 10B converts the luminance image data generated in the color luminance conversion processing into an ideal parallel stereo image obtained when two pinhole cameras are mounted in parallel. Specifically, each of the imaging units 10A and 10B converts each pixel in the luminance image data using a calculation result of a distortion amount of each pixel calculated by using a polynomial expression as follows: $\Delta x=f(x, y)$, $\Delta y=g(x, y)$. The polynomial expression is, for example, based on a quintic polynomial expression regarding x (a horizontal direction position of the image) and y (a vertical direction position of the image). Accordingly, a parallel luminance image can be obtained in which distortion of an optical system in the imaging units 10A and 10B is corrected. Such luminance images (a right captured image and a left captured image) are supplied to the FPGA 14 of the analyzing unit 3.

Figure 3:
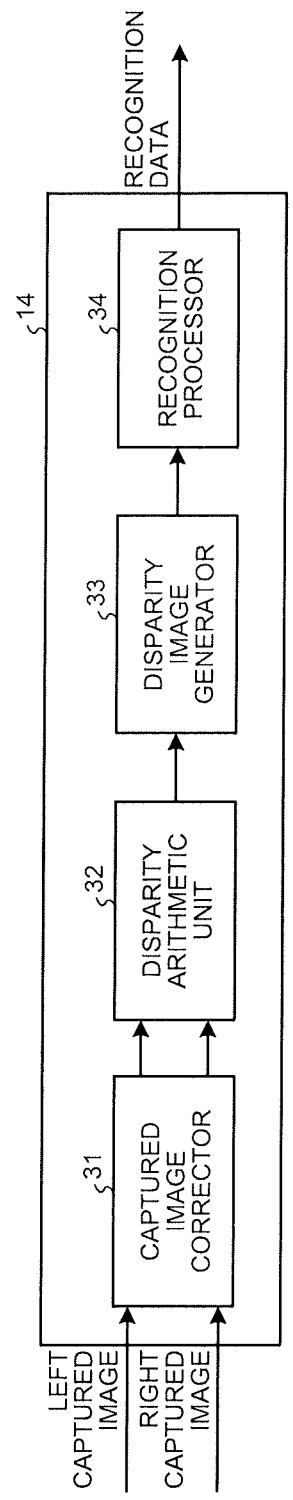
FIG. 3 is a block diagram illustrating a functional configuration of the analyzing unit according to the first embodiment.

FIG. 3 is a functional block diagram of each function that is implemented when the FPGA 14 executes the object detection program stored in the ROM 16 in the equipment control system according to the first embodiment. As illustrated in FIG. 3, the FPGA 14 implements a captured image corrector 31, a disparity arithmetic unit 32, a disparity image generator 33, and a recognition processor 34 by executing the object detection program.

The captured image corrector 31 performs correction such as gamma correction and distortion correction (parallelization of left and right captured images) on a left captured image and a right captured image. The disparity arithmetic unit 32 calculates a disparity value d from the left and right captured images corrected by the captured image corrector 31. Details about the disparity arithmetic unit 32 will be described later. The disparity image generator 33 generates a disparity image using the disparity value d calculated by the disparity arithmetic unit 32. The disparity image represents a pixel value corresponding to the disparity value d calculated for each pixel on the reference image as a pixel value of each pixel. The recognition processor 34 recognizes an object preceding the vehicle and generates recognition data as a recognition result using the disparity image generated by the disparity image generator 33.

Part or all of the captured image corrector 31 to the recognition processor 34 may be implemented as hardware such as an integrated circuit (IC). The object detection program may be recorded and provided in a computer-readable recording medium such as a compact disc read only memory (CD-ROM), a flexible disk (FD), a compact disc recordable (CD-R), a DVD, a Blu-ray Disc (registered trademark), and a semiconductor memory, as an installable or executable file. The DVD is an abbreviation for a "digital versatile disc". The object detection program may be provided to be installed via a network such as the Internet. The object detection program may be embedded and provided in a ROM in a device, for example.

Outline of Disparity Arithmetic Unit

The disparity arithmetic unit 32 assumes luminance image data of the imaging unit 10A as reference image data, assumes luminance image data of the imaging unit 10B as comparative image data, and generates disparity image data representing disparity between the reference image data and the comparative image data. Specifically, the disparity arithmetic unit 32 defines a block including a plurality of pixels (for example, 16 pixels×1 pixel) around one disparity of interest (pixel of interest) for a predetermined "row" of the reference image data. In the same "row" in the comparative image data, a block having the same size as that of the defined block of the reference image data is shifted in a horizontal line direction (X-direction) one pixel by one pixel. The disparity arithmetic unit 32 calculates a correlation value representing a correlation between a feature value indicating a feature of a pixel value of the defined block in the reference image data and a feature value indicating a feature of a pixel value of each block in the comparative image data.

The disparity arithmetic unit 32 performs matching processing of selecting a block in the comparative image data that is most correlated with the block in the reference image data from among blocks in the comparative image data based on the calculated correlation value. Thereafter, the disparity arithmetic unit 32 calculates, as the disparity value d, a position shift amount between the pixel of interest of the block in the reference image data and the corresponding pixel of the block in the comparative image data selected in the matching processing. By performing such processing of calculating the disparity value d on the entire region or a specific region of the reference image data, the disparity image data is obtained.

As the feature value of the block used for matching processing, for example, a value of each pixel (luminance value) in the block can be used. As the correlation value, the sum total of absolute values of differences between values of the respective pixels (luminance values) in the block in the reference image data and values of the respective pixels (luminance values) in the block in the comparative image data corresponding to the former pixels can be used, for example. In this case, a block in which the sum total is the smallest is detected as a most correlated block.

Configuration of Disparity Arithmetic Unit

Figure 4:
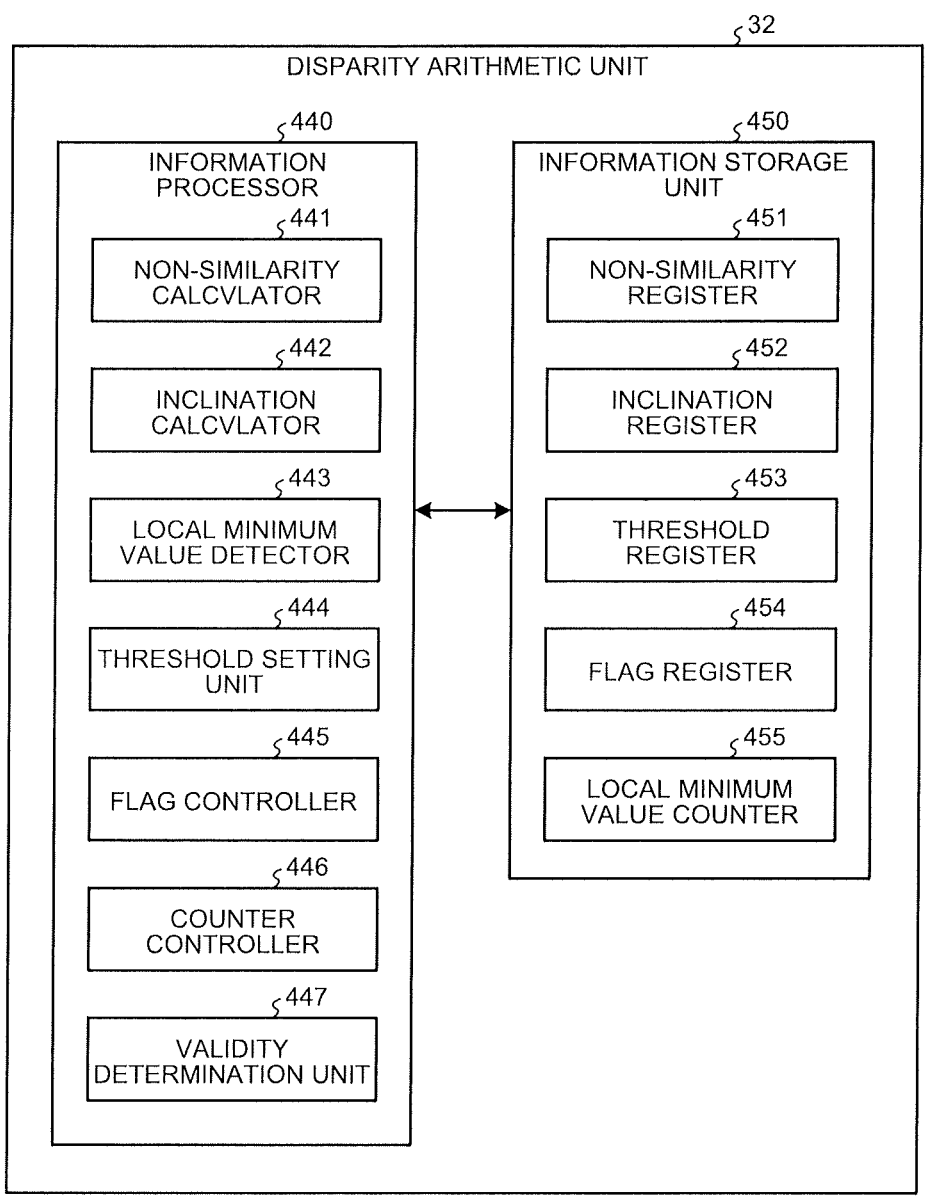
FIG. 4 is a block diagram illustrating a functional configuration of a principal part of a disparity arithmetic unit according to the first embodiment.

FIG. 4 is a block diagram illustrating a functional configuration of a principal part of the disparity arithmetic unit 32. As illustrated in the drawing, the disparity arithmetic unit 32 includes an information processor 440 and an information storage unit 450, which can communicate with each other.

The information processor 440 includes a non-similarity calculator 441, an inclination calculator 442, a local minimum value detector 443, a threshold setting unit 444, a flag controller 445, a counter controller 446, and a validity determination unit 447. The information storage unit 450 includes a non-similarity register 451, an inclination register 452, a threshold register 453, a flag register 454, and a local minimum value counter 455. The validity determination unit 447 performs an operation including an invalidation unit.

The non-similarity calculator 441 is an example of an evaluation value calculator, calculates a non-similarity as an evaluation value of a correlation between the reference image and the comparative image (an evaluation value of matching) using a zero-mean sum of squared difference (ZSSD) method disclosed in a reference (Japanese Laid-open Patent Publication No. 2013-45278), for example, and writes the non-similarity into the non-similarity register 451.

In place of the zero-mean sum of squared difference (ZSSD) method, a sum of squared difference (SSD) method, a sum of absolute difference (SAD) method, or a zero-mean sum of absolute difference (ZSAD) method may be used. When a disparity value at a sub-pixel level smaller than one pixel is required in matching processing, an estimation value is used. As a method of estimating the estimation value, for example, an equiangular linear method or a quadratic curve method can be used. However, an error occurs in the estimated disparity value at the sub-pixel level. Thus, an estimation error correction (EEC) method and the like may be used for reducing an estimation error.

Next, the inclination calculator 442 calculates an inclination of non-similarity from a difference value of non-similarity at adjacent shift positions in a case in which the comparative image is shifted with respect to the reference image, and writes the inclination into the inclination register 452. The local minimum value detector 443 is an example of an extreme value detector, and detects the local minimum value of non-similarity as an extreme value of the evaluation value of correlation based on the fact that the inclination value calculated by the inclination calculator 442 is changed from negative to positive.

The threshold setting unit 444 is an example of an updater. When a value held by the flag register 454 is "0" (when a flag is off), the threshold setting unit 444 generates an upper threshold Uth and a lower threshold Lth as set values for a range of the local minimum value above and below the local minimum value based on the local minimum value detected by the local minimum value detector 443, and writes the upper threshold Uth and the lower threshold Lth into the threshold register 453. At this point, the flag controller 445 writes a value "1" indicating that the upper threshold Uth and the lower threshold Lth are updated into the flag register 454. The counter controller 446 as an example of a counter counts up the value of the local minimum value counter 455. The value of the local minimum value counter 455 represents the number of minimum values of non-similarity within a range of the threshold held by the threshold register 453.

When the value held by the flag register 454 is "1" (when the flag is on) and the local minimum value detected by the local minimum value detector 443 is within the range of the threshold held by the threshold register 453, the counter controller 446 counts up the value of the local minimum value counter 455.

The counter controller 446 includes a resetting unit. When the value held by the flag register 454 is "1", and the inclination calculated by the inclination calculator 442 is kept negative and the non-similarity calculated by the non-similarity calculator 441 becomes lower than the lower threshold Lth held by the threshold register 453, the counter controller 446 resets the value of the local minimum value counter 455. In this case, the flag controller 445 writes "0" into the flag register 454, and resets the flag.

Processing of Disparity Arithmetic Unit

Figure 5:
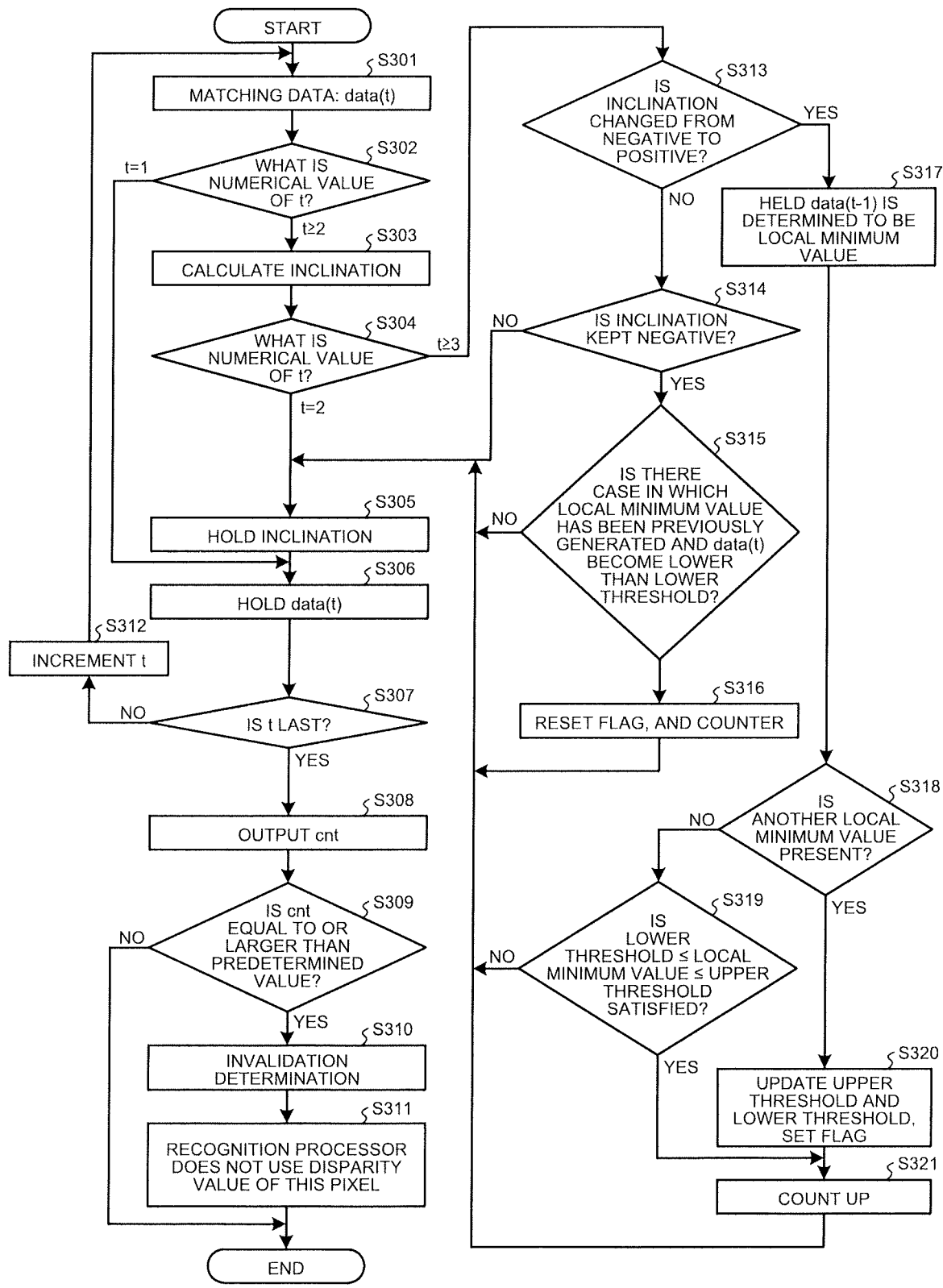
FIG. 5 is a flowchart illustrating processing performed by the disparity arithmetic unit according to the first embodiment.
Figure 6:
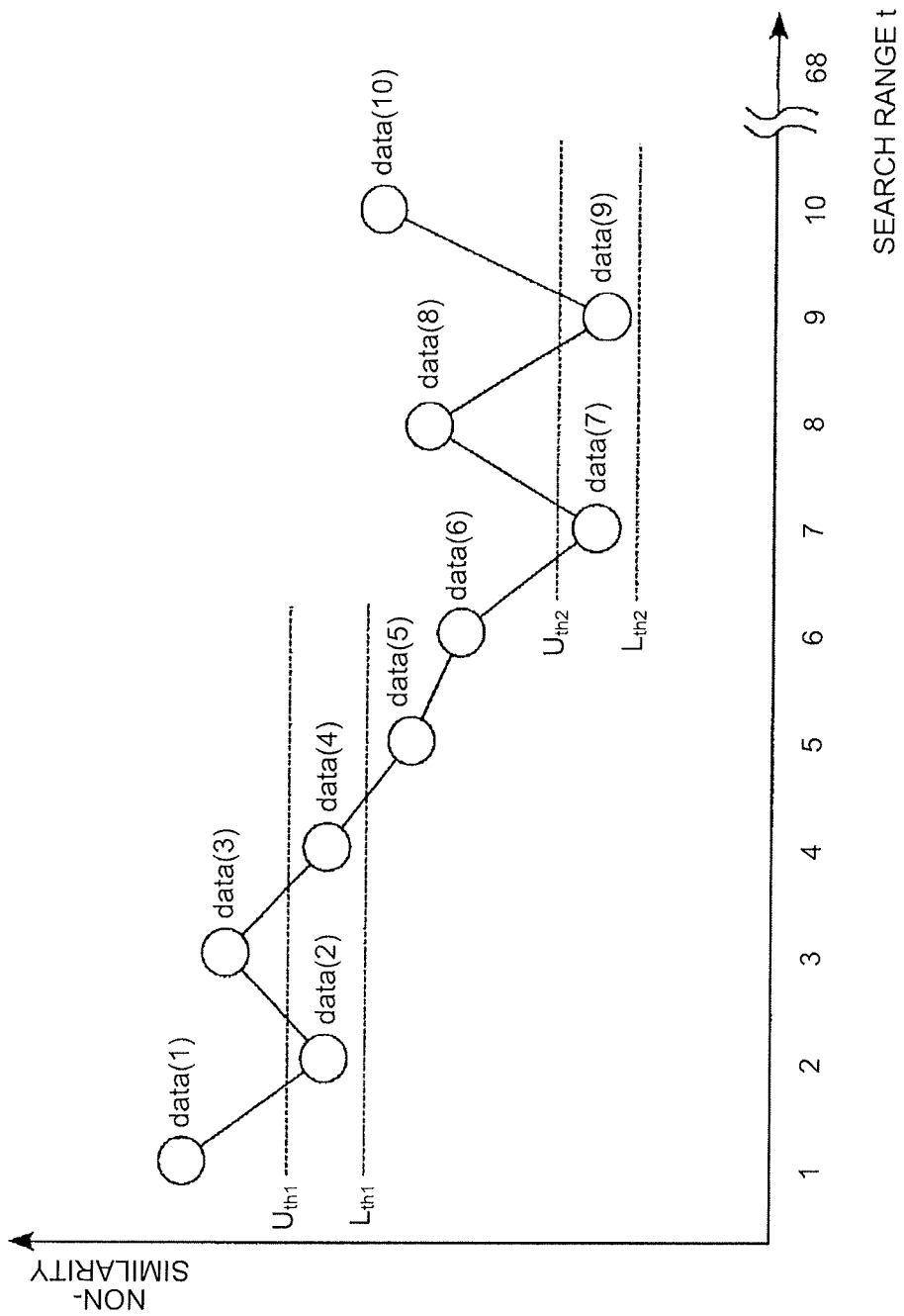
FIG. 6 is a diagram illustrating a specific example of processing performed by the disparity arithmetic unit illustrated in FIG. 5.

FIG. 5 is a flowchart illustrating processing performed by the disparity arithmetic unit 32 illustrated in FIG. 4. FIG. 6 is a diagram illustrating a specific example of the processing illustrated in FIG. 5. The horizontal axis in FIG. 6 indicates a search range, that is, a shift amount (deviation) of a pixel position in the comparative image with respect to a pixel position in the reference image, and the vertical axis indicates the non-similarity as the evaluation value for matching. The following describes an operation performed by the disparity arithmetic unit 32 with reference to these drawings.

The flowchart illustrated in FIG. 5 is performed for each pixel of the reference image. The search range of the comparative image with respect to the pixels in the reference image is 1 to 68 pixels. At the time when the flowchart is started, no data is written into the non-similarity register 451, the inclination register 452, and the threshold register 453. "0" is set to the flag register 454, and an initial value of the local minimum value counter 455 is "0". In explanation for this procedure, a value (flag) held by the flag register 454 is represented by C, and a count value of the local minimum value counter 455 is represented by cnt.

When matching data: data(t) representing the non-similarity is input by the non-similarity calculator 441 (Step S301), a numerical value of t is determined (Step S302). At first, t=1 (t=1 at Step S302), so that data(1) is written into the non-similarity register 451 to be held (Step S306), and whether t is the last value, that is, whether t is the last of the search range is determined (Step S307). Here, t=1 is not the last value of the search range (No at Step S307), so that t is incremented to satisfy t=2 (Step S312), and the process proceeds to Step S301.

In this case, the process proceeds in order of Step S301, Step S302, and Step S303, and the inclination calculator 442 calculates an inclination between the data(1) and data(2) (Step S303). The inclination is calculated from a difference between two pieces of data "data(2)−data(1)". Next, the numerical value of t is determined (Step S304). In this case, t=2 (t=2 at Step S304), so that a reference numeral of inclination is written into the inclination register 452 to be held (Step S305).

Next, the data(2) is written into the non-similarity register 451 to be held (Step S306), whether t is the last value is determined (Step S307), t is incremented to 3 (Step S312) based on a determination result (No at Step S307), and the process proceeds to Step S301.

In this case, the processes at Step S301, Step S302, and Step S303 are the same as those in the former case (when t=2). However, t=3 in this case, so that the process proceeds from Step S304 to Step S313, and whether the inclination is changed from negative to positive is determined. This determination processing is performed by the local minimum value detector 443.

When "data(2)−data(1)" is negative and "data(3)−data(2)" is positive, it is determined that the inclination is changed from negative to positive (Yes at Step S313). In this case, held data(t−1), that is, the data(2) is determined to be the local minimum value herein (Step S317).

When the data(2) is determined to be the local minimum value at Step S317, whether another local minimum value is present, that is, whether C=0 is satisfied is determined (Step S318). When C=0 is satisfied (Yes at Step S318), the threshold setting unit 444 updates the upper threshold Uth and the lower threshold Lth held by the threshold register 453, and the flag controller 445 sets C=1 to set the flag (Step S320).

The data(1) to the data(3) in FIG. 6 correspond to the processes described above. That is, the data(2) is determined to be the local minimum value at Step S317, and the upper threshold Uth1 and the lower threshold Lth1 are updated (as initial setting in this case) above and below the local minimum value at Step S320. The upper threshold Uth and the lower threshold Lth are assumed to be "data(2)+predetermined value" and "data(2)−predetermined value", respectively. In this case, a circuit configuration is preferably simplified by employing "predetermined value=2"".

After Step S320, the counter controller 446 counts up the value of the local minimum value counter 455 (Step S321). In this case, the count value is "1". The count value represents the number of local minimum values within a range of the threshold (equal to or smaller than the upper threshold Uth1, and equal to or larger than the lower threshold Lth1) set at Step S320.

After Step S321, the process proceeds in order of Step S305, Step S306, and Step S307, and the reference numeral of inclination (positive in this case) and the matching data (the data(3) in this case) are held, whether t is the last is determined (not the last in this case, so that No at S307), t is incremented to 4 (Step S312), and the process proceeds to Step S301.

Also in this case in which t=4 is satisfied (the same applies to the following numbers to the last of the search range, that is, t=68), the process proceeds in order of Step S301, Step S302, Step S303, Step S304, and Step S313, and whether the inclination is changed from negative to positive is determined to detect the local minimum value (Step S313). The case in which the inclination is changed from negative to positive (Yes at Step S313) has been described above (when t=3), so that the following describes another case (No at Step S313).

In this case, it is determined whether the inclination is kept negative (Step S314). If the inclination is not kept negative (No at Step S314), the process proceeds in order of Step S305, Step S306, and Step S307. Content of the processes at Step S305, Step S306, and Step S307 and subsequent steps is the same as that in the case of t=3.

In a case of FIG. 6, when t=4, the process proceeds as follows: No at Step S313, No at Step S314, Step S305, Step S306, Step S307, and Step S312. Thus, the reference numeral (negative in this case) of inclination and the data(4) are held and t is incremented to 5, and the process proceeds to Step S301.

Also in this case, the process proceeds in order of Step S301, Step S302, Step S303, Step S304, and Step S313, and it is determined whether the inclination is changed from negative to positive (Step S313). The cases of Yes at Step S313 and No at Step S313 to No at Step S314 have been already described for the cases of t=3 and t=4, respectively, so that the following describes a case of No at Step S313 to Yes at Step S314.

In this case, it is determined whether the local minimum value has been previously generated and the data(t) (data(5) in this case) becomes lower than the lower threshold (Step S315). In a case of No at Step S315, that is, when the local minimum value is not previously generated or when the data(t) is not lower than the lower threshold even though the local minimum value is generated, the process proceeds to Step S305.

In a case of Yes at Step S315, that is, when the local minimum value has been previously generated and the data(t) becomes lower than the lower threshold, the process proceeds to Step S316. At Step S316, the flag controller 445 sets C=0 to reset the flag, and the counter controller 446 resets the local minimum value counter 455 to "0".

In a case of FIG. 6, when t=5, the inclination is kept negative, so that the process proceeds as follows: No at Step S313, Yes at Step S314, Yes at Step S315, Step S316, Step S305, Step S306, Step S307, and Step S312. Accordingly, the reference numeral of inclination (negative in this case) and the matching data (data(5) in this case) are held, whether t is the last is determined (not the last in this case, so that No at Step S307), t is incremented to (Step S312), and the process proceeds to Step S301.

Also in this case, the process proceeds in order of Step S301, Step S302, Step S303, Step S304, and Step S313, and it is determined whether the inclination is changed from negative to positive. In a case of FIG. 6, similarly to the case of t=5, the inclination is kept negative in a case of t=6, so that the steps through which the process passes after Step S313 are the same as those in the case of t=5.

Subsequently, also in a case of t=7, similarly to the cases of t=5 and t=6, the inclination is kept negative, so that the steps through which the process passes after Step S313 are the same as those in the case of t=5. In a case of t=8, similarly to the case of t=3, the inclination is changed from negative to positive, so that the process proceeds from Step S317 to Step S318. When t=5, C=0 is set, so that Yes at Step S318 is determined, and the process proceeds in order of Step S320, Step S321, and Step S305.

In this case, at Step S320, the upper threshold Uth1 and the lower threshold Lth1 are updated to be an upper threshold Uth2 and a lower threshold Lth2, respectively, as illustrated in FIG. 6. At this point, the upper threshold Uth2 and the lower threshold Lth2 are "data(7)+predetermined value"

and "data(7)−predetermined value", respectively. The count value (=1) counted up at Step S321 represents the number of local minimum values within a range of the updated threshold that is updated at Step S320 (equal to or smaller than the upper threshold Uth2, and equal to or larger than the lower threshold Lth2).

In a case of FIG. 6, the inclination is changed from positive to negative when t=9, so that the process proceeds as follows: No at Step S313, No at S314, and S305. The inclination is changed from negative to positive when t=10, so that the process proceeds from Step S317 to S318. When t=8, C=1 is set, so that No at Step S318 is determined, and the process proceeds to Step S319.

At Step S319, it is determined whether data(9) as the local minimum value determined at Step S317 is within a range of the lower threshold (Lth2) and the upper threshold (Uth2). If the data(9) is within the range (Yes at Step S319), the data(9) is counted up (Step S321), and the process proceeds to Step S305. If the data(9) is out of the range (No at Step S319), the process directly proceeds to Step S305.

In the case of FIG. 6, the data(9) is within the range of the lower threshold (Lth2) and the upper threshold (Uth2), so that the data(9) is counted up and the value of the local minimum value counter 455 becomes "2". The count value "2" means that there are two local minimum values within the range of the latest thresholds (the upper threshold Uth2 and the lower threshold Lth2 in this case).

Subsequently, the processes are repeated in order of Step S301→Step S302→Step S303→Step S304 Step S313 until the last t (68 in this case) of the search range is reached. When the last t is reached (Yes at Step S307), the counter controller 446 outputs the count value of the local minimum value counter 455 (Step S308).

Next, the validity determination unit 447 determines whether the count value is equal to or larger than a predetermined value (for example, 2) (Step S309). If the count value is equal to or larger than the predetermined value (Yes at Step S309), the validity determination unit 447 determines that the count value is invalid (Step S310), and sets the flag so that the recognition processor 34 does not use the disparity value of the pixel in the reference image (Step S311).

Figure 14:
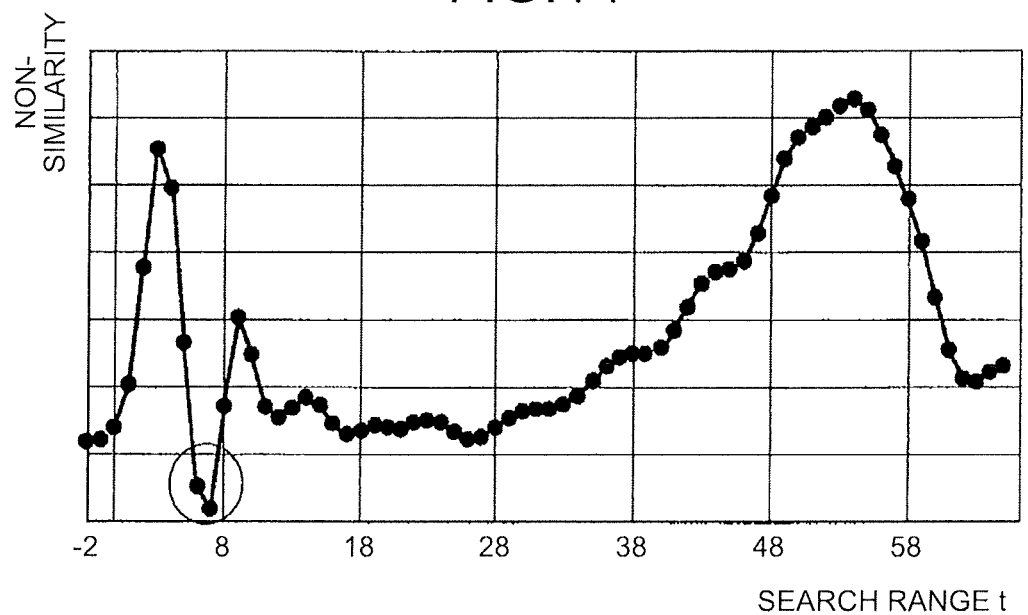
FIG. 14 is a diagram illustrating an example of a graph of a matching processing result.

FIG. 14 illustrates a graph of an example of a matching processing result. In FIG. 14, the horizontal axis indicates the search range, that is, the shift amount (deviation) of the pixel position in the comparative image with respect to the pixel position in the reference image, and the vertical axis indicates the non-similarity as the evaluation value for correlation. In FIG. 14, the non-similarity is the smallest for the seventh search pixel surrounded with a circle, so that 7 is the most probable disparity value. A negative value on the horizontal axis is of a search range for obtaining a sub-pixel disparity.

Figure 15:
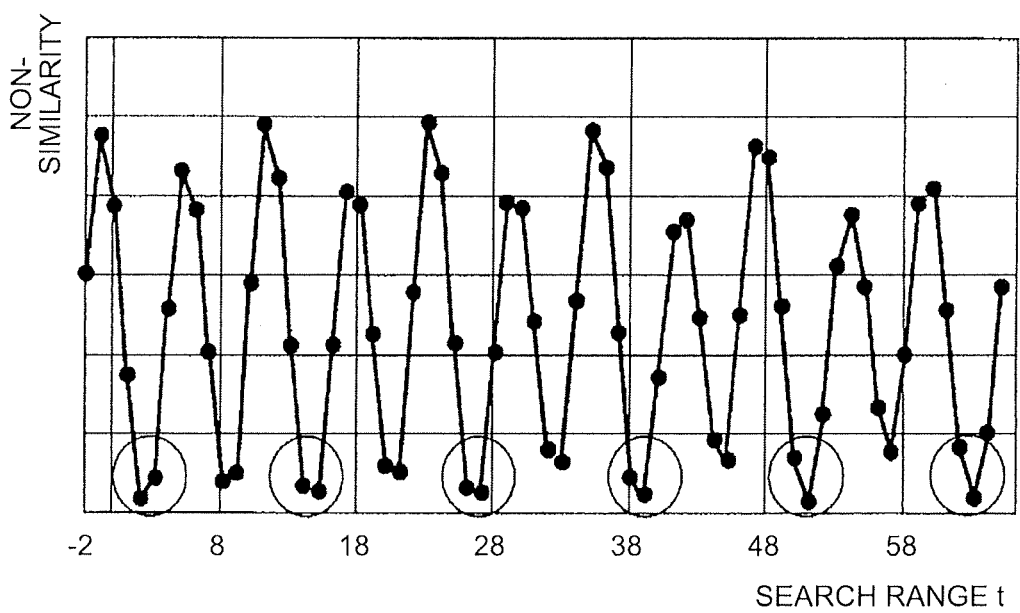
FIG. 15 is a diagram illustrating another example of the graph of the matching processing result.

However, in a process of calculating the disparity of an object having a repetitive pattern on an external appearance such as a building on which windows having the same design are lined, a tile wall on which the same shapes and figures are lined, a fence, a load-carrying platform of a truck vehicle, or a load-carrying platform of a trailer vehicle, as illustrated in FIG. 15, two or more (six in the example of FIG. 15) matched portions may appear in some cases, so that the most probable disparity value may be erroneously output.

With such a fact, for example, an erroneous disparity value is actually output (erroneous matching), the erroneous disparity value indicating that the object having the repetitive pattern present at a distant position is positioned nearby. Specifically, when a distance between the own vehicle and a tile wall having the repetitive pattern on which the same shapes and figures are lined is 5 m, the disparity value for the distance of 5 m and the disparity value for the distance of 2 m are mixed to be output. Due to this, in object recognition processing at a rear stage, one wall is recognized as two walls including a wall having a distance of 2 m from the own vehicle and a wall having a distance of 5 m from the own vehicle. Then a brake is operated although the distance between the tile wall and the own vehicle is 5 m, which is called "erroneous braking".

However, the disparity arithmetic unit 32 searches for neither the number of values of non-similarity close to each other nor the most probable disparity value after calculation of the non-similarity in the search range is finished. The disparity arithmetic unit 32 counts the number of local minimum values of non-similarity and searches for the disparity at the same time. When the local minimum value of non-similarity becomes out of a predetermined range, the disparity arithmetic unit 32 updates the predetermined range, and counts the number of local minimum values of non-similarity in the updated range. Due to this, when a repetitive pattern appears, a time until the disparity arithmetic unit 32 determines whether to use the repetitive pattern for the object recognition processing can be shortened without increasing of a processing time. Thus, with the equipment control system according to the first embodiment including the disparity arithmetic unit 32, "erroneous braking" can be suppressed.

In the flowchart illustrated in FIG. 5, search is performed in an ascending order of t. Search may also be performed in a descending order of t. In the flowchart illustrated in FIG. 5, when the local minimum value is first detected, the upper threshold and the lower threshold are set in accordance with the local minimum value. Alternatively, optional upper threshold and lower threshold may be initially set at the time when the procedure is started. In the flowchart illustrated in FIG. 5, the non-similarity is used as the evaluation value for correlation, the value of the non-similarity being reduced as the correlation is increased. A similarity, the value of which increases as the correlation increases, may also be used.

Details about upper threshold and lower threshold

In FIG. 5 and FIG. 6 described above, the upper threshold Uth1 and the lower threshold Lth1 are "data(2)+predetermined value" and "data(2)−predetermined value", respectively, and the upper threshold Uth2 and the lower threshold Lth2 are "data(7)+predetermined value" and "data(7)−predetermined value", respectively. That is, the upper threshold Uth and the lower threshold Lth are calculated to be set using expressions of "newly detected local minimum value+predetermined value" and "newly detected local minimum value−predetermined value", respectively. Hereinafter, the upper threshold and the lower threshold calculated by the above expressions are referred to as a first upper threshold and a first lower threshold, respectively.

Next, the following describes a case in which a result of invalidation determination (Step S310) in the processing illustrated in FIG. 5 is true, and a case in which the result is false. The following also describes a second upper threshold and a second lower threshold serving as an upper threshold and a lower threshold by which the occurrence of the false result can be reduced.

Case in which Result of Invalidation Determination is True

Figure 7:
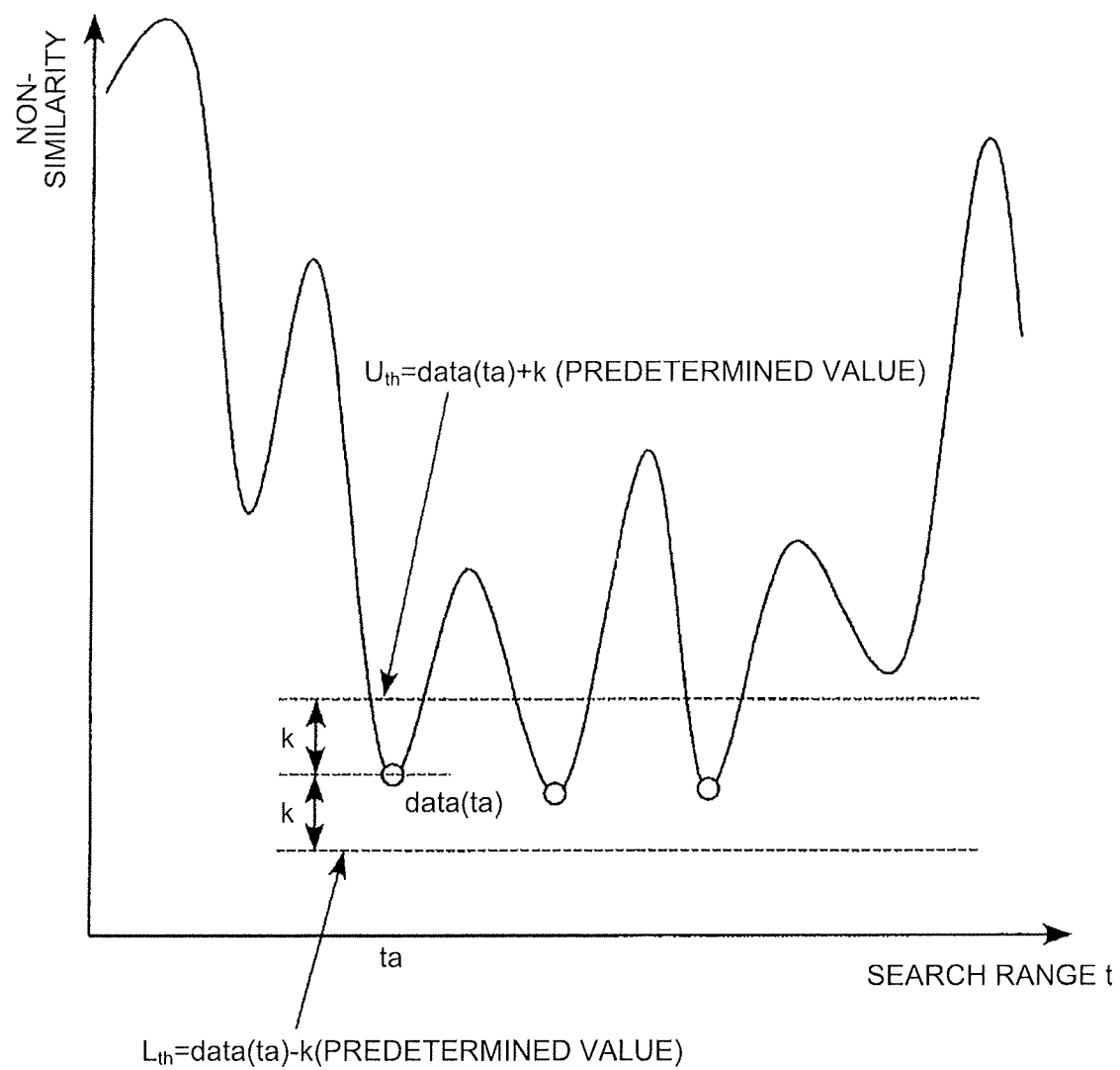
FIG. 7 is a diagram for explaining a case in which a result of invalidation determination in the processing illustrated in FIG. 5 is true.

FIG. 7 is a diagram for explaining a case in which a result of invalidation determination in the processing illustrated in FIG. 5 is true. The horizontal axis and the vertical axis in FIG. 7 and FIG. 8 to FIG. 13 (described later) are the same as those in FIG. 6, and indicate the search range and the non-similarity, respectively.

FIG. 7 illustrates a matching processing result in a case in which an image in the search range has a repetitive pattern having much texture. Amplitude of non-similarity (for example, ZSSD) is large due to the much texture. In a case of FIG. 7, Uth (first upper threshold) and Lth (first lower threshold) are set to be "data(ta)+k (predetermined value)" and "data(ta)−k (predetermined value)", respectively, with respect to data(ta) as the local minimum value, and three local minimum values in the range of threshold are counted. Based on this correct count value, a true determination result (invalid) can be obtained. Case in which result of invalidation determination is false FIG. 8 is a diagram for explaining a case in which the result of invalidation determination in the processing illustrated in FIG. 5 is false.

Figure 8:
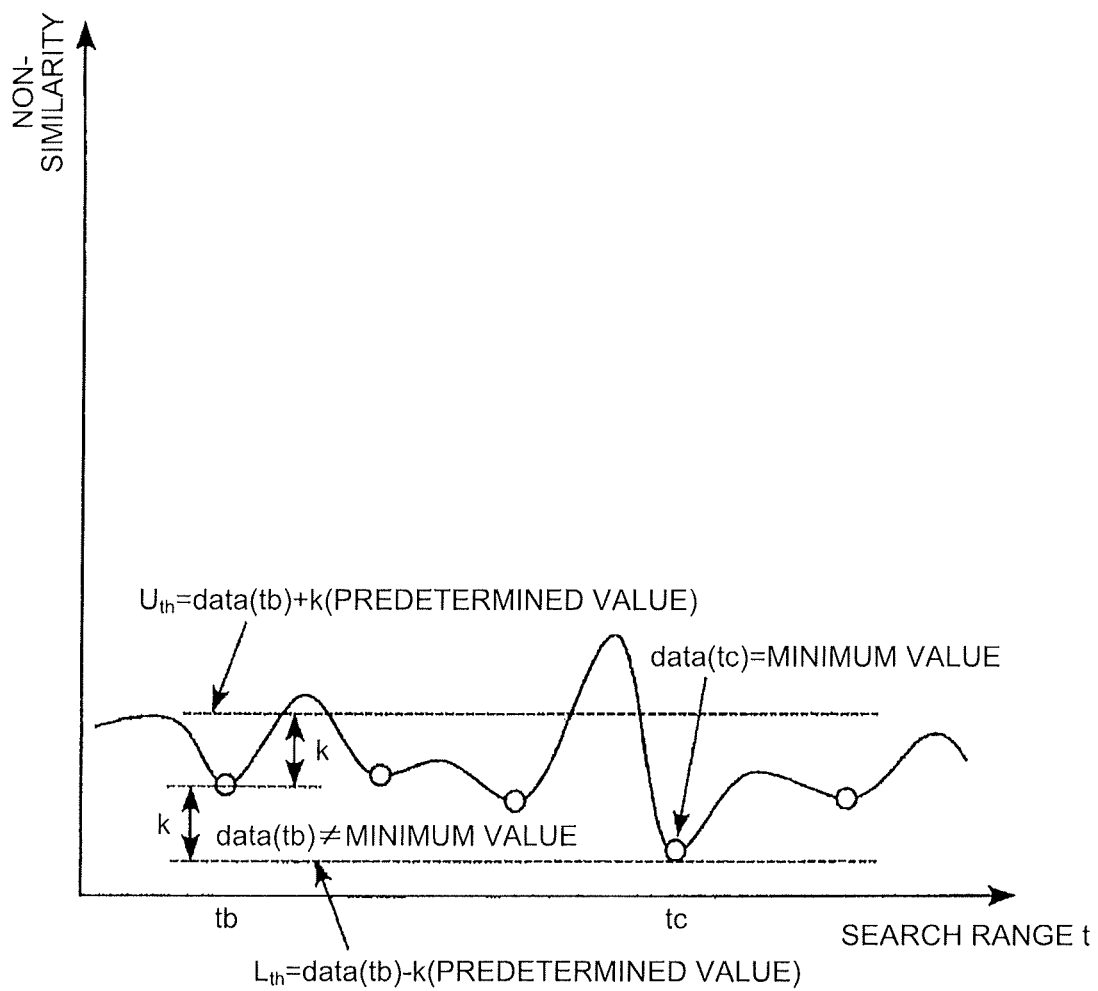
FIG. 8 is a diagram for explaining a case in which the result of invalidation determination in the processing illustrated in FIG. 5 is false.
Figure 9:
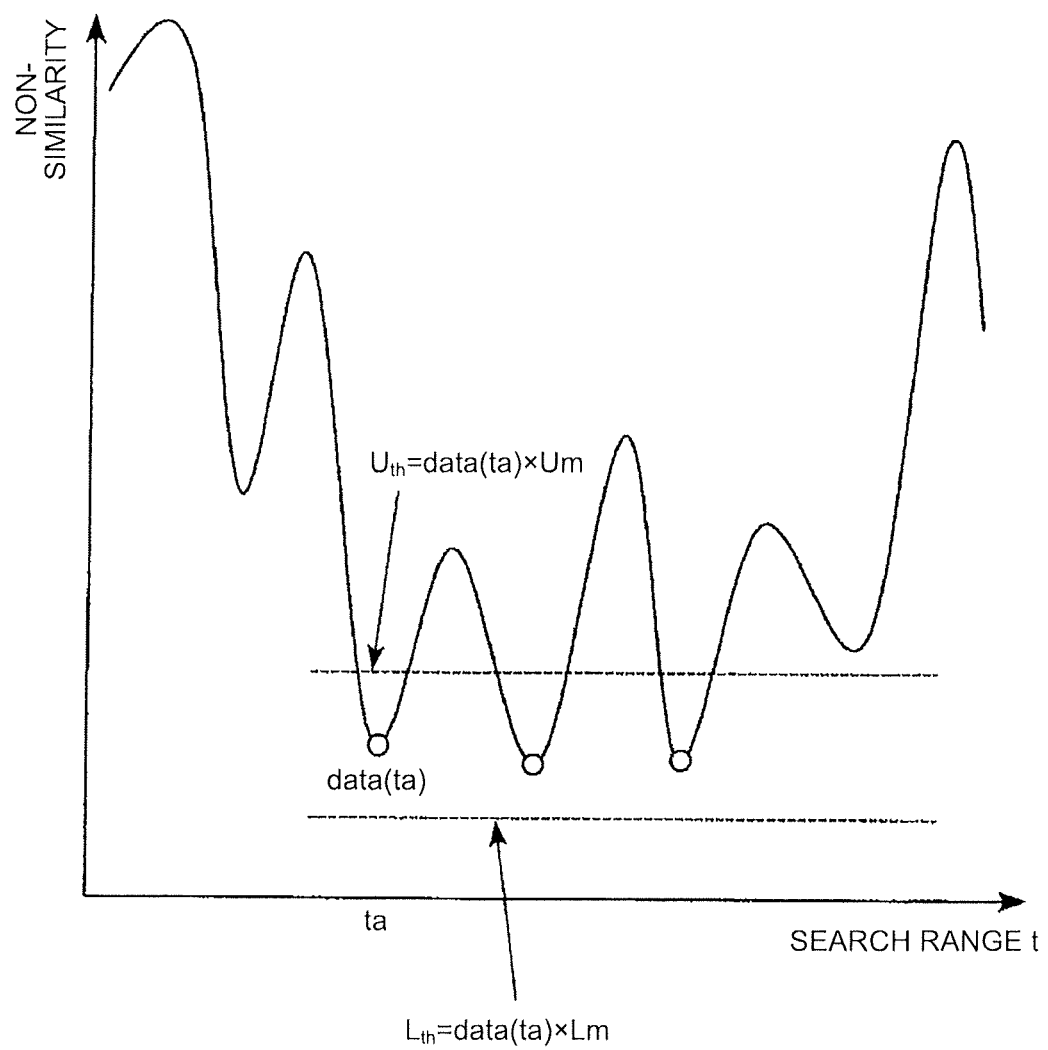
FIG. 9 is a diagram for explaining a threshold that can prevents a false result of invalidation determination from occurring in the processing illustrated in FIG. 5.
Figure 10:
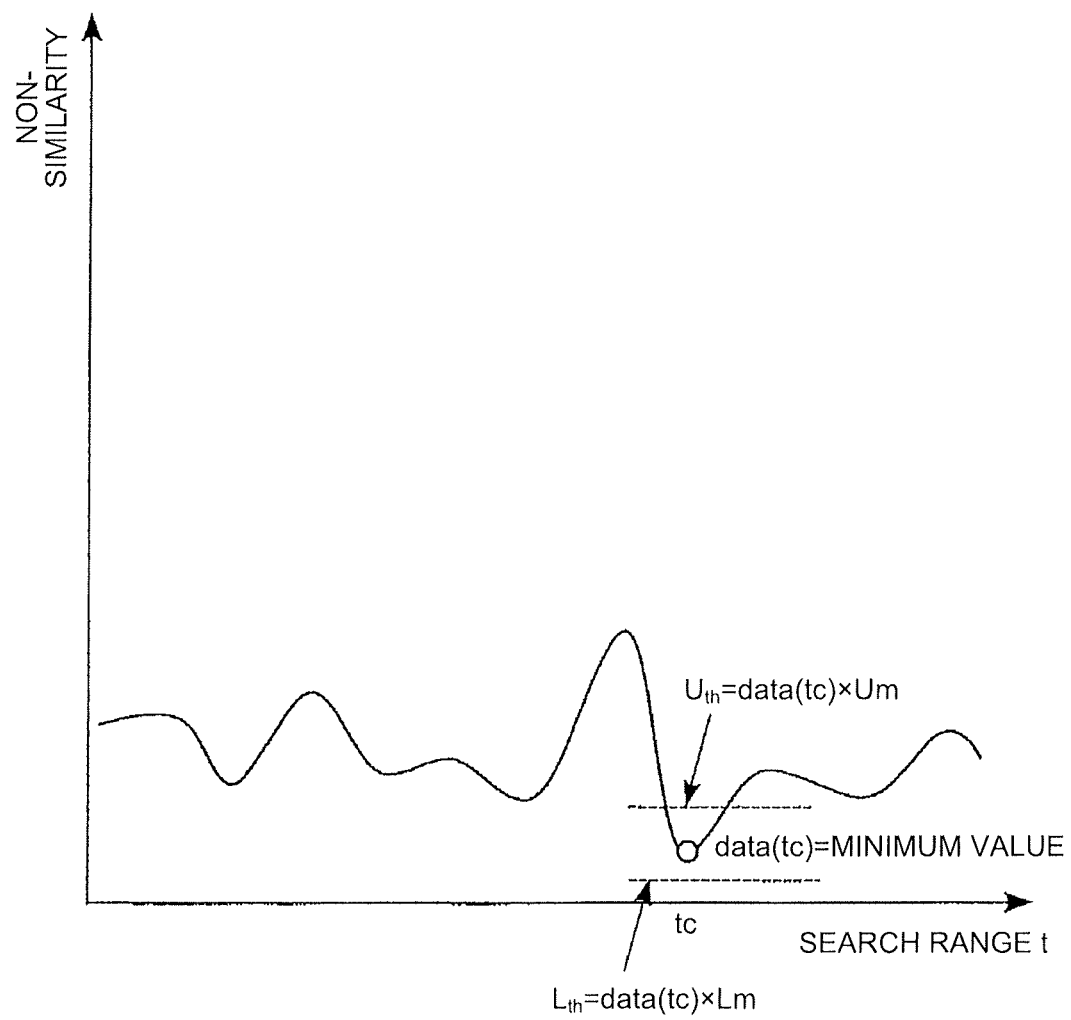
FIG. 10 is another diagram for explaining a threshold that can prevents a false result of invalidation determination from occurring in the processing illustrated in FIG. 5.

FIG. 8 illustrates a matching processing result in a case in which the image in the search range has no repetitive pattern and has less texture. The amplitude of non-similarity is small due to the less texture. In the case of FIG. 8, the minimum value=data(tc) is present at one point. Accordingly, although a correct disparity value tc can be obtained, five local minimum values are counted in a range of Uth (first upper threshold) and Lth (first lower threshold) set above and below data(tb) as the local minimum value, not being the minimum value. Then invalidation is determined based on the count value. Regarding second upper threshold and second lower threshold FIG. 9 and FIG. 10 are examples of diagrams for explaining a second threshold that can prevents a false result of invalidation determination from occurring in the processing illustrated in FIG. 5. FIG. 9 and FIG. 10 illustrate a matching processing result in a case in which the image in the search range is the same as that in FIG. 7 and FIG. 8, respectively.

The second upper threshold and the second lower threshold are set to values corresponding to the newly detected local minimum value. That is, in the case of FIG. 9 for example, Uth (second upper threshold) and Lth (second lower threshold) are set to be "data(ta)×Um" and "data(ta)×Lm", respectively, with respect to the data(ta) as the local minimum value. In this case, Um and Lm are coefficients representing a ratio. Values of Um and Lm satisfy "Um>1>Lm", and may be any values so long as an updated upper threshold is smaller than the lower threshold before updating. In the case of FIG. 9, similarly to the case of FIG. 7, three local minimum values within the range of threshold are counted.

In the case of FIG. 10, Uth (second upper threshold) and Lth (second lower threshold) are set to be "data(tc)×Um" and "data(tc)×Lm", respectively, with respect to the data(tc) as the smallest local minimum value. In the case of FIG. 10, unlike the case of FIG. 8, the count value of the local minimum value is "1", so that a correct disparity value tc is employed.

In this way, by setting the upper threshold and the lower threshold to values corresponding to the newly detected local minimum value, a probability of counting only the smallest local minimum value present at one point can be increased when the image in the search range has no repetitive pattern and has less texture. That is, by changing the first upper threshold and the first lower threshold in a repetitive pattern detection algorithm illustrated in FIG. 5 into the second upper threshold and the second lower threshold, respectively, it is possible to prevent a situation from occurring in which invalidation is determined although a correct disparity value is obtained.

In FIG. 9 and FIG. 10, the upper threshold and the lower threshold corresponding to the local minimum value are calculated by multiplying the local minimum value by the coefficient. Alternatively, k in FIG. 7 and FIG. 8 may be changed depending on the local minimum value in place of being fixed at a predetermined value.

Minimum Value Processing and Exception Processing

FIG. 11 is a diagram for explaining minimum value processing and exception processing performed by the disparity arithmetic unit 32.

As a basis of disparity value calculation, calculating the disparity value in which the non-similarity such as ZSSD is the minimum value is a prerequisite, so that, in addition to an algorithm for counting the number of local minimum values within the range of the upper and lower thresholds at a minimum level illustrated in FIG. 5, a pure minimum value and a disparity value corresponding thereto need to be successively processed to be searched for.

To cope with a case in which the minimum value of non-similarity is the last in the search range as illustrated in the upper graph (A) in FIG. 11, or a case in which the minimum value of non-similarity is the first in the search range as illustrated in the lower graph (B) FIG. 11, the pure minimum value is successively processed, and when the minimum value is smaller than the lower threshold Lth that is finally updated, the disparity that gives the minimum value is output. In this case, after the algorithm illustrated in FIG. 5 for 68 pieces of non-similarity data is finished, invalidation determination is forcibly performed as exception processing.

That is, in a case of A in FIG. 11 for example, when the algorithm illustrated in FIG. 11 is finished, the local minimum value counter 455 is reset to 0 at Step S316 based on data(68) as the minimum value. However, invalidation determination is forcibly performed. To obtain a sub-pixel disparity, the search range t indicated by the horizontal axis of A in FIG. 11 is −2 to 65, and data(65) on the right end is the minimum value.

For example, in a case of B in FIG. 11, when the algorithm illustrated in FIG. 5 is finished, the count value of the local minimum value counter 455 is "3". However, data(1) smaller than Lth is present, so that invalidation determination is finally forcibly performed. To obtain the sub-pixel disparity, the search range t indicated by the horizontal axis of B in FIG. 11 is −2 to 65, and data(−2) on the left end is the minimum value.

The minimum value processing and the exception processing are summarized as the following (i) to (iii).

(i) When the non-similarity at an end of the search range is the minimum value, and the disparity value (value of the search range t) in which the minimum value is detected is negative, invalidation is forcibly determined regardless of the count value of the local minimum value counter 455.

(ii) When the non-similarity at an end of the search range is included in a finally determined threshold range, the local minimum value counter 455 is counted up. For example, only the left end is included in the finally determined threshold range, an output count value is counted up by 1. For example, only the right end is included in the finally determined threshold range, the output count value is counted up by 1. For example, both of the left end and the right end are included in the finally determined threshold range, the output count value is counted up by 2.

(iii) In cases of monotonic increase and monotonic decrease, the local minimum value is not detected and the count value becomes 0. However, invalidation is forcibly determined.

Arithmetic Result of Disparity Arithmetic Unit

Figure 12:
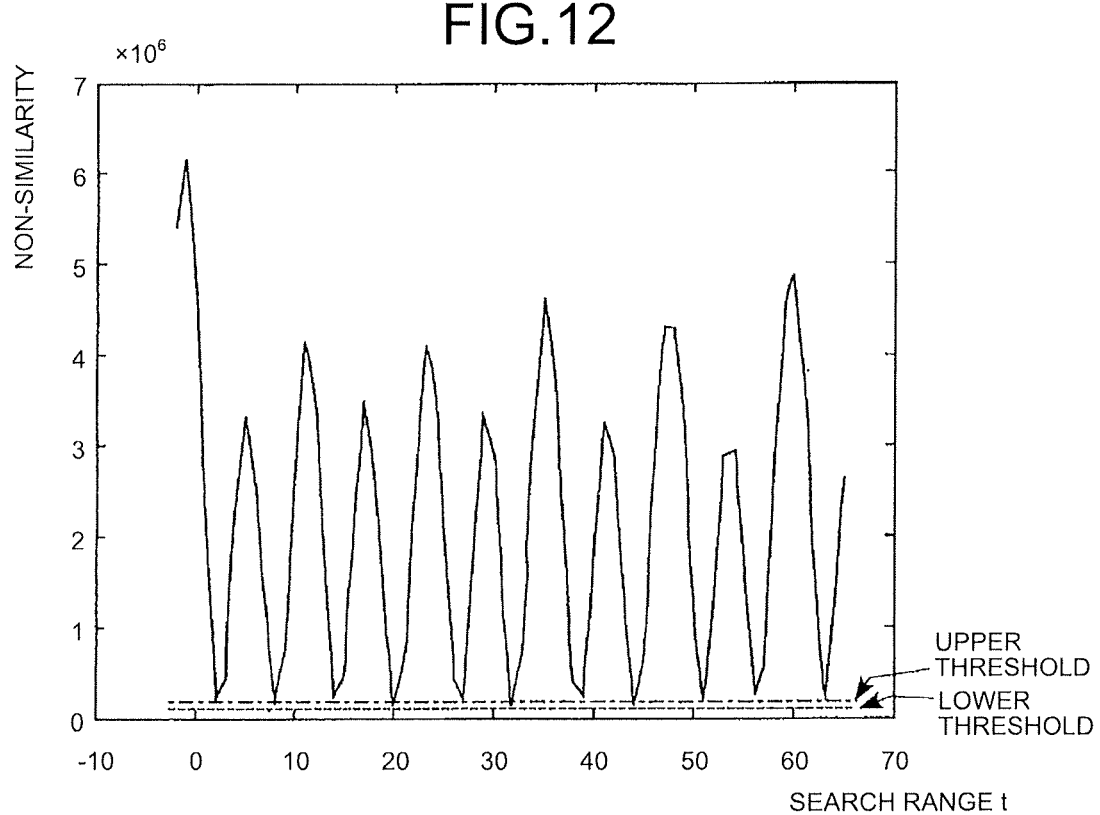
FIG. 12 is a diagram illustrating an example of an arithmetic result of the disparity arithmetic unit according to the first embodiment.
Figure 13:
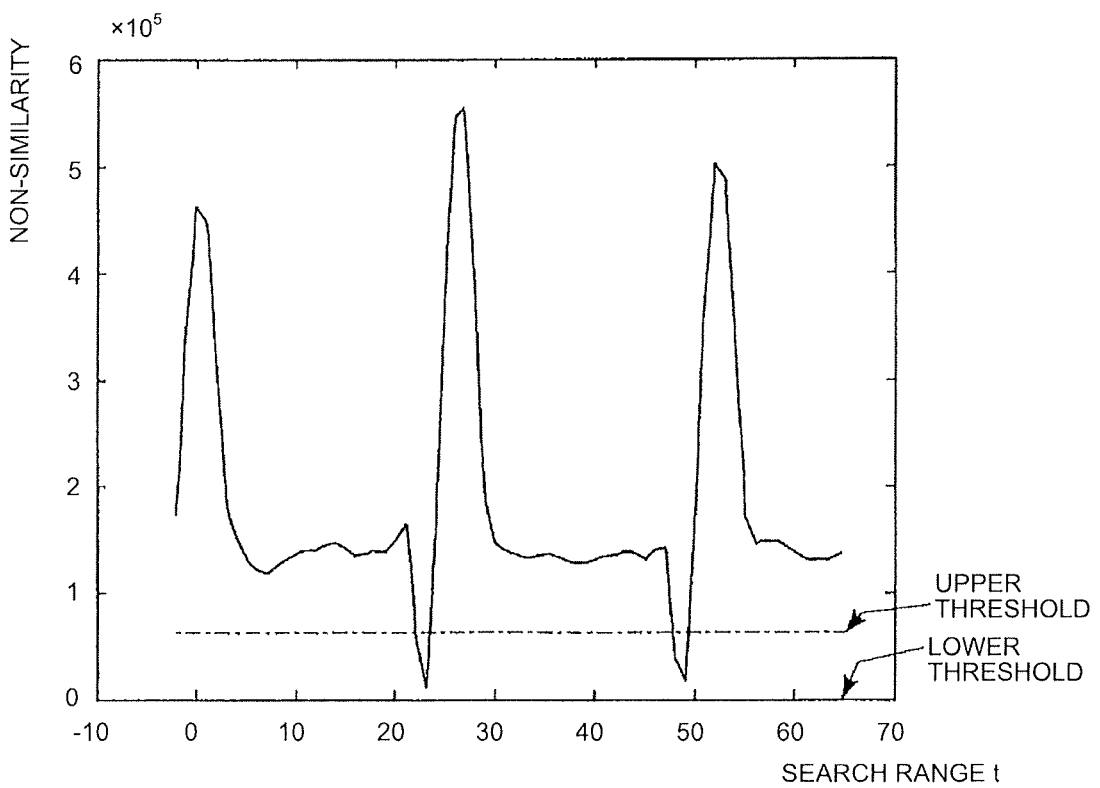
FIG. 13 is a diagram illustrating another example of the arithmetic result of the disparity arithmetic unit according to the first embodiment.

FIG. 12 is a diagram illustrating a first example of an arithmetic result of the disparity arithmetic unit 32, and FIG. 13 is a diagram illustrating a second example thereof. In these figures, the horizontal axis indicates the search range, and the non-similarity indicated by the vertical axis is ZSSD calculated using a block of 7 pixels×7 pixels. A negative portion of the search range is used for obtaining the sub-pixel disparity.

FIG. 12 is obtained by calculating disparity values of a captured image of a window of a building. The upper threshold and the lower threshold are finally updated values (set in accordance with the local minimum value of the 8th pixel in the search range, in this case). The number of local minimum values in this threshold range is 4, and invalidation is determined by the validity determination unit 447.

FIG. 13 is obtained by calculating disparity values of a captured image of a tile wall. The upper threshold and the lower threshold are finally updated values (set in accordance with the local minimum value of the 23rd pixel in the search range, in this case). The number of local minimum values in this threshold range is 2, and invalidation is determined by the validity determination unit 447.

To detect the minimum value of non-similarity in the search range based on ZSSD and the like, for example, the smallest non-similarity is detected from among the first non-similarity, the second non-similarity, and the third non-similarity, and the smallest non-similarity is compared with the fourth and subsequent non-similarities. Detection processing may be performed for each pixel to detect the minimum value of non-similarity so that the minimum value of non-similarity within a predetermined threshold is detected. In this case, a load of arithmetic processing of non-similarity on the FPGA 14 can be reduced.

Alternatively, for example, after 64 non-similarities in the search range are once stored in a memory, the non-similarity indicating the minimum value may be detected, and the number of non-similarities included within the threshold determined based on the minimum value of non-similarity may be detected to detect the minimum value of non-similarity.

Operation of Disparity Image Generator

Figure 16:
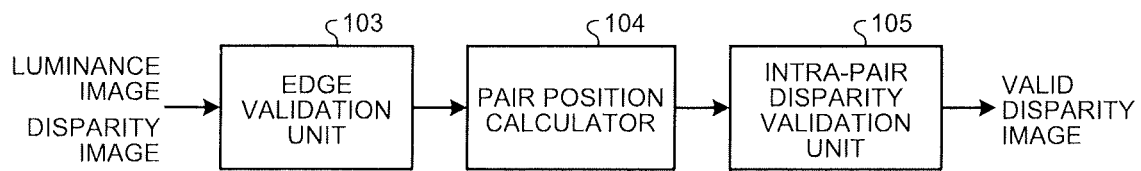
FIG. 16 is a specific functional block diagram of a valid disparity determination unit.

Next, the following describes an operation of the disparity image generator 33. As illustrated in FIG. 16, the disparity image generator 33 includes an edge validation unit 103, a pair position calculator 104, and an intra-pair disparity validation unit 105. The edge validation unit 103 is an example of a valid pixel determination unit to which the disparity value d (disparity image) calculated by the disparity arithmetic unit 32 and the luminance image generated by the captured image corrector 31 are supplied. When the luminance image and the disparity image are input, the edge validation unit 103 determines, to be an edge pixel, a pixel in which an amount of an edge component is equal to or larger than a predetermined component amount in the luminance image, and validates the disparity value at the pixel position. The amount of edge component in the luminance image is an example of a feature value. The edge pixel is a valid pixel, and the disparity corresponding to the edge pixel on the disparity image is a valid disparity.

The pair position calculator 104 is an example of a calculator, assumes two adjacent valid disparities on the same line in the disparity image as a valid disparity pair, and calculates a distance difference in a depth direction in a real space and an interval in a horizontal direction (positional relation) of the disparities. The pair position calculator 104 then determines whether the distance difference is within the predetermined threshold range, and whether the interval in the horizontal direction is within another predetermined threshold range in accordance with the disparity value of the valid disparity pair.

The intra-pair disparity validation unit 105 is an example of a validation unit, and validates the intra-pair disparity in the valid disparity pair (disparity between the valid disparity pair) when both of the distance difference and the interval in the horizontal direction determined by the pair position calculator 104 are within the threshold range. An intra-pair disparity to be validated is in the vicinity of two disparity values of the valid disparity pair.

Figure 17:
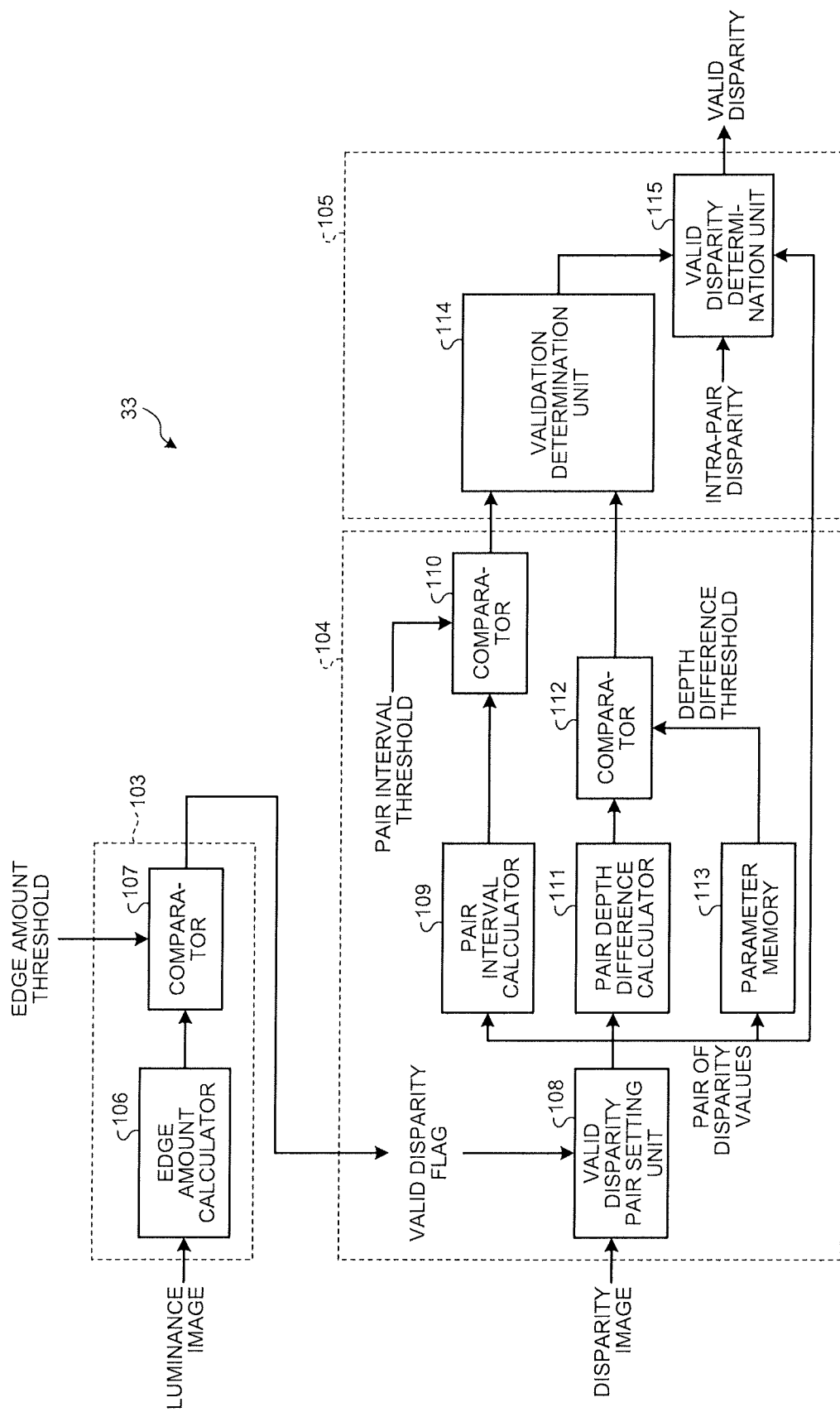
FIG. 17 is a further specific functional block diagram of the valid disparity determination unit.

FIG. 17 illustrates a more detailed functional block diagram of the disparity image generator 33. In FIG. 17, as described above, a valid disparity determination unit 102 includes the edge validation unit 103, the pair position calculator 104, and the intra-pair disparity validation unit 105.

The edge validation unit 103 includes an edge amount calculator 106 and a comparator 107. The pair position calculator 104 includes a valid disparity pair setting unit 108, a pair interval calculator 109, a comparator 110, a pair depth difference calculator 111, a comparator 112, and a parameter memory 113. The intra-pair disparity validation unit 105 includes a validation determination unit 114 and a valid disparity determination unit 115. The valid disparity pair setting unit 108 is an example of a pair setting unit. Each of the pair interval calculator 109 and the pair depth difference calculator 111 is an example of a calculator. The valid disparity determination unit 115 is an example of a validation unit.

To the edge amount calculator 106 of the edge validation unit 103, a luminance image within a predetermined processing target range in an input image is input. The edge amount calculator 106 calculates an edge amount from the luminance image. As a method for calculating the edge amount, for example, a Sobel filter or a secondary differential filter can be used. Considering reduction of hardware and characteristics of block matching processing, a difference between pixels on both ends on the same line as the pixel of interest may be used.

The comparator 107 of the edge validation unit 103 compares an absolute value of the edge amount calculated by the edge amount calculator 106 with an edge amount threshold determined in advance, and supplies a comparison output thereof as a valid disparity flag to the valid disparity pair setting unit 108 of the pair position calculator 104. For example, the absolute value of the calculated edge amount is larger than the edge amount threshold, the comparison output at high level is supplied to the valid disparity pair setting unit 108 (the valid disparity flag is turned on). When the absolute value of the calculated edge amount is smaller than the edge amount threshold, the comparison output at low level is supplied to the valid disparity pair setting unit 108 (the valid disparity flag is turned off).

Figure 18:
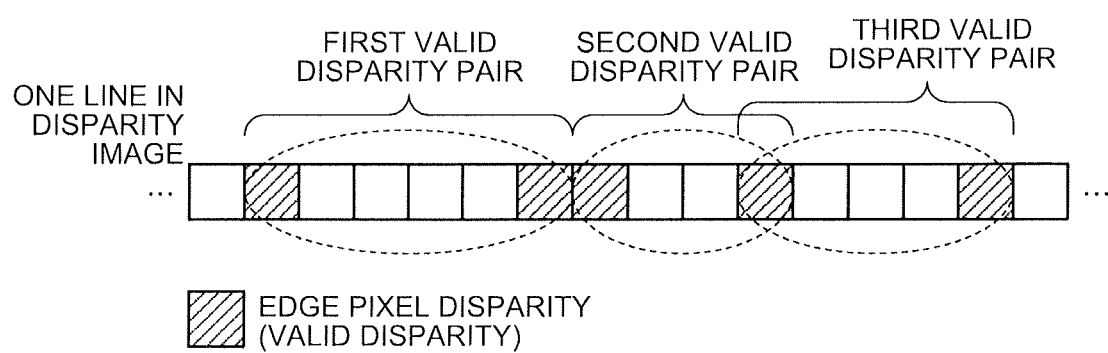
FIG. 18 is a schematic diagram for explaining an operation of setting a valid disparity pair in a valid disparity pair setting unit.

The valid disparity flag and the disparity image within the predetermined range described above are supplied to the valid disparity pair setting unit 108 of the pair position calculator 104. By way of example, as illustrated in FIG. 18, the valid disparity pair setting unit 108 sets, as the valid disparity pair, two disparities that are not adjacent to each other at pixel positions closest to each other on the same line for which the valid disparity flag is turned on. FIG. 18 illustrates an example in which a first valid disparity pair, a second valid disparity pair, and a third valid disparity pair are set.

Next, the interval between the pair in the horizontal direction and the difference between the pair in the depth direction are calculated using respective disparity values of disparities of the valid disparity pair as described above. The pair interval calculator 109 calculates the interval between the pair in the horizontal direction in the real space from the disparity value of the left pixel of the valid disparity pair and the interval between the pair (pixel unit) on the disparity image. The pair interval calculator 109 calculates depths from the respective two disparities of the valid disparity pair, and calculates an absolute value of a difference between the depths.

The comparator 110 compares the interval between the pair in the horizontal direction calculated by the pair interval calculator 109 with a pair interval threshold. The pair interval threshold is determined in advance with reference to an actual width of an object to be detected. For example, to detect a person alone, the pair interval threshold is set to be a width occupied by a person. For example, a width of a large-size vehicle is prescribed to be 2500 mm at the maximum in Japan. Thus, in detecting a vehicle, the pair interval threshold is set to be the maximum width of the vehicle that is legally prescribed. The comparator 110 compares such a pair interval threshold with the interval between the pair in the horizontal direction calculated by the pair interval calculator 109, and supplies a comparison output to the validation determination unit 114 of the intra-pair disparity validation unit 105.

The pair depth difference calculator 111 calculates a depth difference in the valid disparity pair described above. A depth difference threshold read from the parameter memory 113 using the pair of disparity values is supplied to the comparator 112. The depth difference threshold read from the parameter memory 113 is determined in accordance with a distance calculated from the disparity value of the left pixel of the valid disparity pair. The depth difference threshold is determined in accordance with the distance because resolution of the disparity obtained from the stereo image of the imaging unit 2 is lowered when the distance to the object to be detected is large, and variance of detection distance becomes large. Accordingly, corresponding to the valid disparity value or a distance calculated therefrom, depth difference thresholds such as 10%, 15%, and 20% of the distance are stored in the parameter memory 113. The comparator 112 compares the depth difference threshold with the depth difference in the valid disparity pair, and supplies a comparison output to the validation determination unit 114 of the intra-pair disparity validation unit 105.

Next, the validation determination unit 114 of the intra-pair disparity validation unit 105 performs intra-pair region validation determination. That is, when the comparison outputs supplied from the comparators 110 and 112 respectively indicate that the interval between the pair in the horizontal direction is equal to or smaller than the pair interval threshold and the pair depth difference is equal to or smaller than the depth difference threshold, the validation determination unit 114 determines that an intra-pair region is valid. The disparity (intra-pair disparity) present in the intra-pair region determined to be valid is supplied to the valid disparity determination unit 115.

If the supplied intra-pair disparity has a value within a disparity value range that is determined in accordance with the disparity values of the pair of disparities, the valid disparity determination unit 115 determines the supplied intra-pair disparity to be the valid disparity, and outputs the intra-pair disparity as the valid disparity. The disparity value range of the pair of disparities means, assuming that two values of the pair of disparities are D1 and D2 (D1>D2), a range of "D2−α, D1+α" with α as a constant. The constant α is determined based on a variance of a disparity of a subject obtained from the imaging unit 2 (stereo camera).

The recognition processor 34 recognizes, for example, an object, a person, and a guardrail preceding the vehicle using the disparity image generated by the disparity image generator 33 as described above, and outputs recognition data as a recognition result.

Effect of First Embodiment

As is clear from the above description, in calculating the disparity from the stereo image captured by the imaging unit 2, the equipment control system according to the first embodiment calculates the disparity based on block matching not only for the pixel position having an edge but also for other portions, and calculates many disparities in advance. Thereafter, the equipment control system validates only the disparity of the pixel having an edge, and when a difference between the validated disparity and a nearby validated disparity positioned nearby is equal to or smaller than a predetermined value, validates a disparity having the same value present between the validated disparity and the nearby validated disparity.

Accordingly, an appropriate disparity can be generated not only at a boundary of a three-dimensional object but also in the three-dimensional object and other spaces. That is, disparity information of a preceding vehicle can be appropriately generated not only at a vehicle edge but also in the vehicle and other spaces. Thus, the disparity image appropriate for recognizing an object can be generated, and the vehicle can be accurately recognized as one object with correct size and distance. This configuration can prevent the preceding vehicle from being coupled with another object to be erroneously detected.

In a process of calculating the disparity of the object having a repetitive pattern on an external appearance, two or more matched portions (with reference to FIG. 15) may appear in some cases, so that the most probable disparity value may be erroneously output. With such a fact, for example, an erroneous disparity value is actually output (erroneous matching), the erroneous disparity value indicating that the object having the repetitive pattern present at a distant position is positioned nearby. Due to this, the recognition processor 34 at a rear stage recognizes one wall as two walls including one wall having a distance of 2 m from the own vehicle and the other wall having a distance of 5 m from the own vehicle. Then a brake is operated although the distance between the wall and the own vehicle is 5 m, which is called "erroneous braking".

However, in the equipment control system according to the first embodiment, the disparity arithmetic unit 32 does not search for the number of values of non-similarity close to each other and the most probable disparity value after calculation of non-similarity in the search range is finished. The disparity arithmetic unit 32 counts the number of local minimum values of non-similarity and searches for the disparity at the same time. When the local minimum value of non-similarity becomes out of the predetermined range, the disparity arithmetic unit 32 updates the predetermined range, and counts the number of local minimum values of non-similarity in the updated range. Due to this, when a repetitive pattern appears, a time until the disparity arithmetic unit 32 determines whether to use the repetitive pattern for the object recognition processing of the recognition processor 34 can be shortened without increasing of a processing time. Additionally, an erroneous disparity value is prevented from being output, and "erroneous braking" described above can be suppressed.

Second Embodiment

Figure 19:
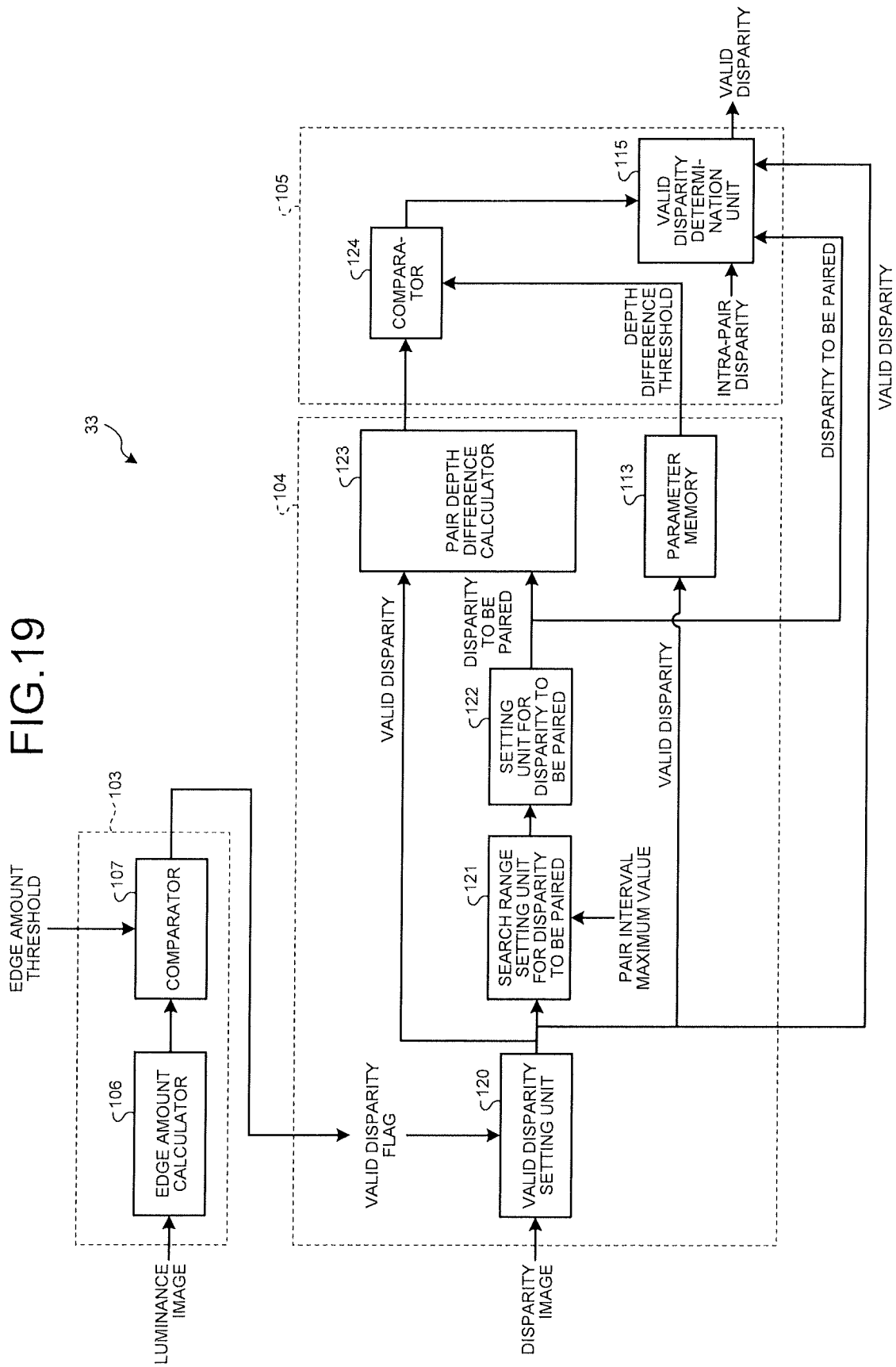
FIG. 19 is a functional block diagram of a valid disparity determination unit in an equipment control system according to a second embodiment.

Next, the following describes the equipment control system according to a second embodiment. In the equipment control system according to the second embodiment, the disparity image generator 33 has functions illustrated in FIG. 19. The second embodiment described below is different from the first embodiment only in the operation of the disparity image generator 33. Thus, the following describes only differences, and redundant description will not be repeated. A part in FIG. 19 that operates similarly to that in FIG. 17 is denoted by the same reference numeral, and detailed description thereof will not be repeated.

That is, in the equipment control system according to the second embodiment, the pair position calculator 104 of the disparity image generator 33 includes a valid disparity setting unit 120, a search range setting unit 121 for a disparity to be paired, a setting unit 122 for a disparity to be paired, a pair depth difference calculator 123, and the parameter memory 113. The intra-pair disparity validation unit 105 includes a comparator 124 and the valid disparity determination unit 115. The search range setting unit 121 for a disparity to be paired is an example of a search range setting unit. The pair depth difference calculator 123 is an example of a difference detector.

Figure 20:
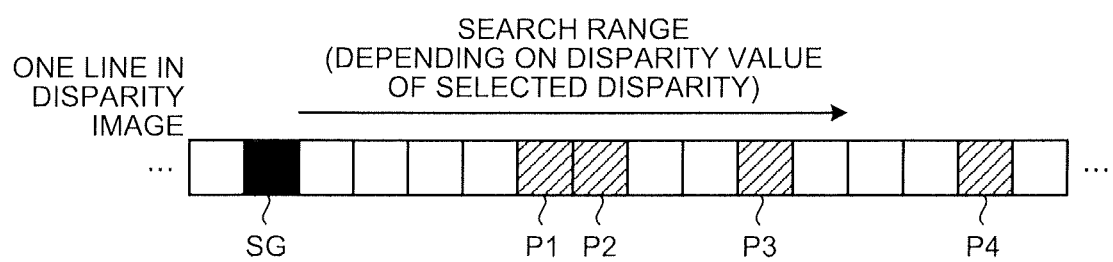
FIG. 20 is a schematic diagram for explaining a search range of the valid disparity pair.

When the disparity image within the predetermined processing target range is input, the valid disparity setting unit 120 of the pair position calculator 104 selects a pixel for which the valid disparity flag is turned on (valid pixel) as a comparison output from the edge validation unit 103. The search range setting unit 121 for a disparity to be paired calculates and sets a range in which a disparity to be paired with the valid disparity is searched for in the right direction of the pixel of the valid disparity on the same line as the selected pixel based on the disparity value (valid disparity) of the selected valid pixel and the maximum value of the interval between the pair. The maximum value of the interval between the pair is an example of pair interval information, and synonymous with the pair interval threshold indicating the actual width of the object to be detected. FIG. 20 is a diagram schematically illustrating an operation of searching for a disparity to be paired performed by the search range setting unit 121 for a disparity to be paired. In FIG. 20, a black solid pixel represents a pixel SG of the valid disparity. Each of the pixel P1 to pixel P4 represents a pixel of the disparity to be paired in the search range set in accordance with the disparity value of the pixel SG of the valid disparity. The search range setting unit 121 for a disparity to be paired calculates a maximum width (right direction) for searching for a disparity to be paired on the disparity image based on the maximum value of the interval between the pair and the disparity value of the selected pixel.

Next, the setting unit 122 for a disparity to be paired detects a disparity closest to the valid disparity in the search range for a disparity to be paired, and causes the detected disparity to be the disparity to be paired. When the disparity to be paired is not present in the search range for a disparity to be paired, processing subsequent to setting processing for a disparity to be paired is not performed by the setting unit 122 for a disparity to be paired, and the search range for a disparity to be paired and the disparity to be paired are set based on the valid disparity that is subsequently set.

The disparity to be paired set by the setting unit 122 for a disparity to be paired is input to the pair depth difference calculator 123 together with the valid disparity as a pair. Similarly to the pair depth difference calculator 111 illustrated in FIG. 17, the pair depth difference calculator 123 calculates an absolute value of a difference in distance based on the input valid disparity and the disparity to be paired.

The comparator 124 of the intra-pair disparity validation unit 105 compares the depth difference threshold read from the parameter memory 113 with the depth difference calculated by the pair depth difference calculator 123 based on the valid disparity. When a comparison output indicating that the depth difference is equal to or smaller than the depth difference threshold is supplied from the comparator 124, the valid disparity determination unit 115 determines that an intra-pair disparity between the valid disparity and the disparity to be paired is the valid disparity to be output. When a comparison output indicating that the value is within a range of two disparity values including the valid disparity and the disparity to be paired is supplied from the comparator 124, the valid disparity determination unit 115 determines that the disparity within the range of the two disparity values including the valid disparity and the disparity to be paired is the valid disparity to be output.

The range of the two disparity values including the valid disparity and the disparity to be paired means, assuming that the two disparity values are D1 and D2 (D1>D2), a range of "D2−α, D1+α" with α as a constant. The constant α can be determined based on a variance of a disparity of a predetermined subject obtained from the imaging unit 2.

With the equipment control system according to the second embodiment, the number of disparity points can be controlled without increasing of disparity noise, and the same effect as that of the first embodiment can be obtained.

Third Embodiment

Figure 21:
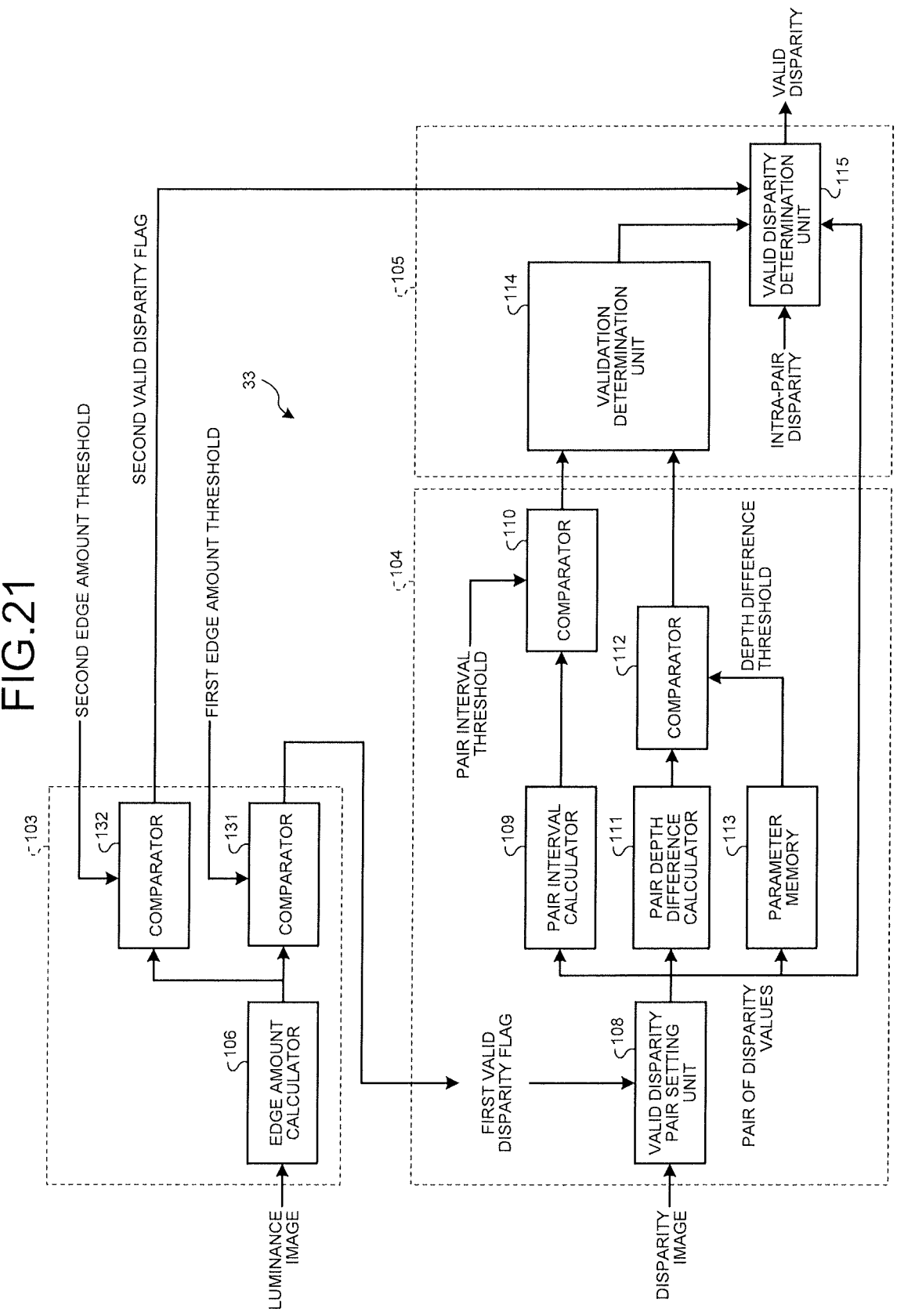
FIG. 21 is a functional block diagram of a valid disparity determination unit in an equipment control system according to a third embodiment.

Next, the following describes the equipment control system according to a third embodiment. In the equipment control system according to the third embodiment, the disparity image generator 33 has functions illustrated in FIG. 21. The third embodiment described below is different from the first embodiment only in the operation of the disparity image generator 33. Thus, the following describes only differences, and redundant description will not be repeated. A part in FIG. 21 that operates similarly to that in FIG. 17 is denoted by the same reference numeral, and detailed description thereof will not be repeated.

That is, in the equipment control system according to the third embodiment, the edge validation unit 103 includes the edge amount calculator 106, a comparator 131, and a comparator 132. A first valid disparity flag from the comparator 131 is supplied to the valid disparity pair setting unit 108 of the pair position calculator 104, and a second valid disparity flag from the comparator 132 is supplied to the valid disparity determination unit 115 of the intra-pair disparity validation unit 105. The first valid disparity flag is an example of first valid disparity information. The second valid disparity flag is an example of second valid disparity information.

That is, in the equipment control system according to the third embodiment, the disparity value of the edge pixel is validated using a plurality of thresholds such as two thresholds (alternatively, three or more thresholds may be used). Specifically, a first edge amount threshold is larger than a second edge amount threshold. The first edge amount threshold is supplied to the comparator 131, and the second edge amount threshold is supplied to the comparator 132. The comparator 131 compares an absolute value of the edge amount calculated by the edge amount calculator 106 with the first edge amount threshold, and supplies the first valid disparity flag for validating a pixel that makes a valid disparity pair to the valid disparity pair setting unit 108 of the pair position calculator 104. The comparator 132 compares the absolute value of the edge amount calculated by the edge amount calculator 106 with the second edge amount threshold, and supplies the second valid disparity flag for finally validating the pixel of the intra-pair disparity to the valid disparity determination unit 115.

Accordingly, the number of disparities to be validated among intra-pair disparities can be controlled, a disparity image optimum for object detection processing at a rear stage can be generated, and the same effect as that in the above embodiments can be obtained. Validation processing of the edge pixel using a plurality of thresholds performed by the edge validation unit 103 can be applied to the second embodiment. The valid disparity setting unit 120 and the search range setting unit 121 for a disparity to be paired are assumed to perform processing on the same line of the disparity image. Alternatively, for example, the valid disparity pair may be set within a range of three lines in total including the same line of the disparity image and lines upper and lower than the same line of the disparity image.

Fourth Embodiment

Next, the following describes the equipment control system according to a fourth embodiment. With the equipment control system according to the fourth embodiment, one object can be correctly recognized as one object by reducing the number of disparity values of erroneous matching described above using FIG. 14 and FIG. 15, and performing object recognition processing with the disparity image including many valid disparity values. Due to this, a correct support operation can be performed.

Figure 22:
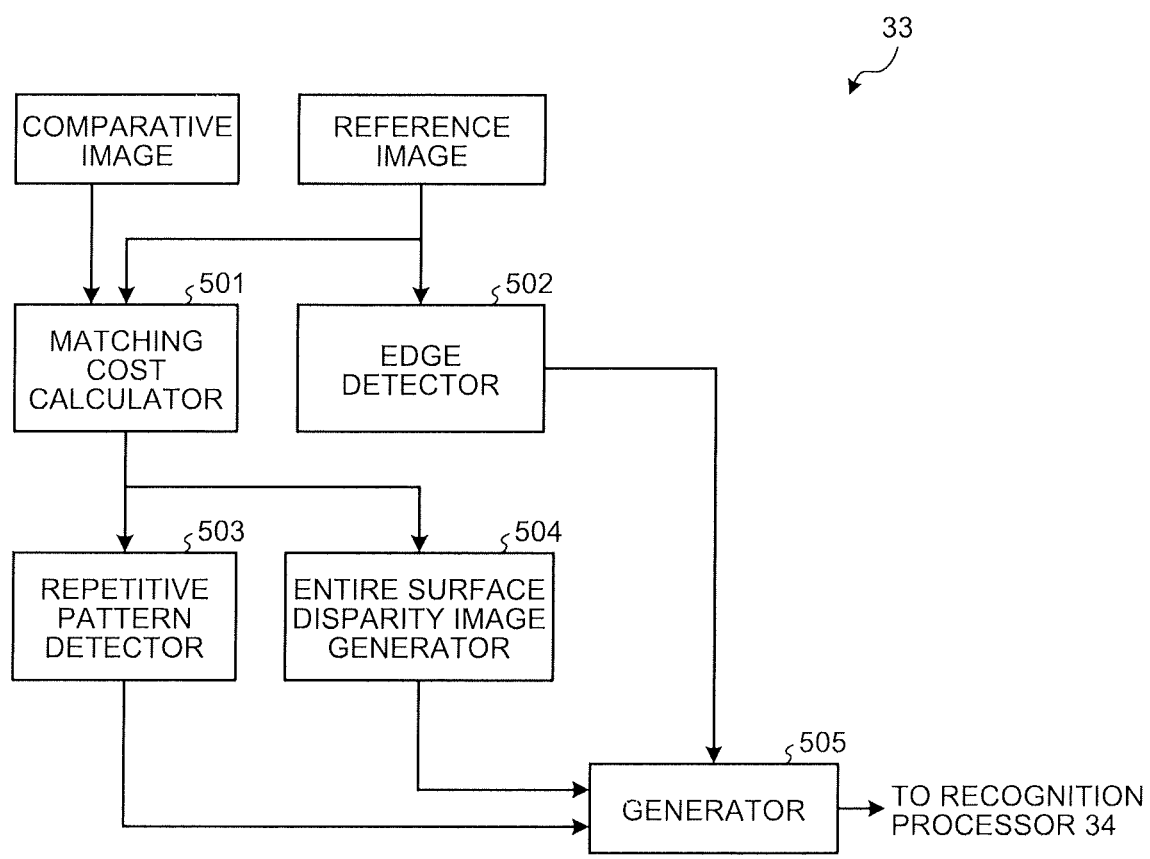
FIG. 22 is a functional block diagram of a principal part of an equipment control system according to a fourth embodiment.

FIG. 22 is a functional block diagram of the disparity image generator 33 disposed in the equipment control system according to the fourth embodiment. As illustrated in FIG. 22, the disparity image generator 33 includes a matching cost calculator 501, an edge detector 502, a repetitive pattern detector 503, an entire surface disparity image generator 504, and a generator 505.

The disparity image generator 33 is implemented when the FPGA 14 executes the object detection program stored in the ROM 16. In this example, the matching cost calculator 501 to generator 505 are implemented as software. Alternatively, part or all of the matching cost calculator 501 to generator 505 may be implemented as hardware such as an integrated circuit (IC).

The object detection program may be recorded and provided in a computer-readable recording medium such as a compact disc read only memory (CD-ROM) and a flexible disk (FD) as an installable or executable file. The object detection program may also be recorded and provided in a computer-readable recording medium such as a compact disc recordable (CD-R), a DVD, a Blu-ray Disc (registered trademark), and a semiconductor memory. The DVD is an abbreviation for a "digital versatile disc". The object detection program may be provided to be installed via a network such as the Internet. The object detection program may be embedded and provided in a ROM in a device, for example.

Figure 23:
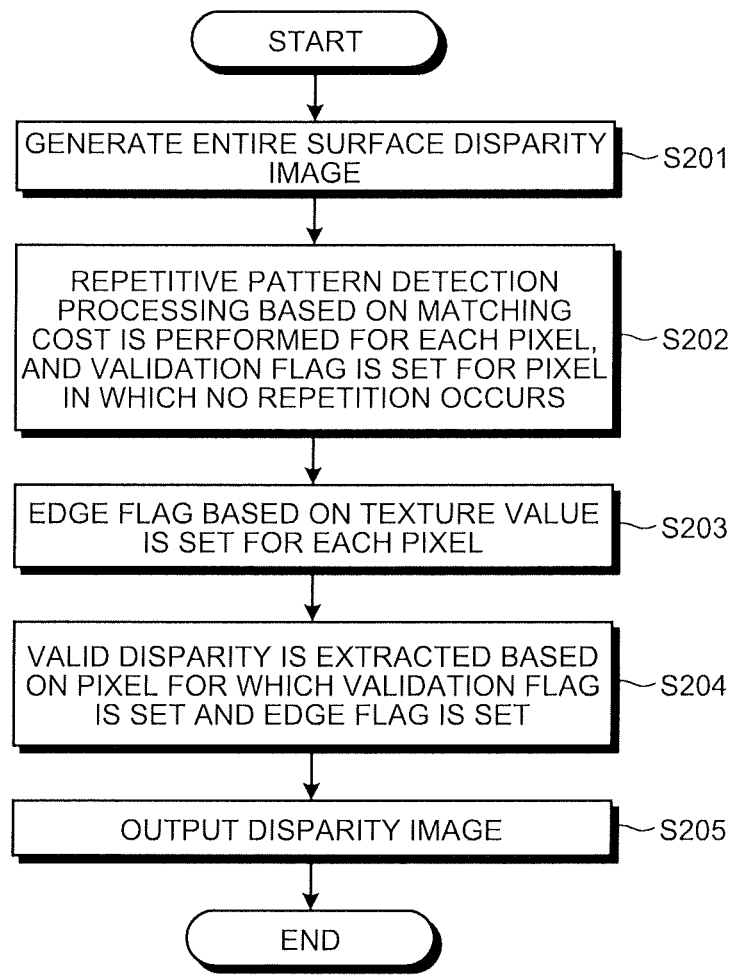
FIG. 23 is a flowchart illustrating a procedure of disparity image generation processing in a disparity image generator in the equipment control system according to the fourth embodiment.

The flowchart of FIG. 23 illustrates a procedure of disparity image generation processing performed by the disparity image generator 33. First, at Step S201, the matching cost calculator 501 calculates a non-similarity (matching cost) of each pixel of a reference image and a comparative image present on the same scanning line among reference images and comparative images captured by the imaging unit 2. The entire surface disparity image generator 504 generates an entire surface disparity image in which all pixels are represented by disparity values based on the calculated non-similarity.

At Step S202, the repetitive pattern detector 503 as an example of a discrimination unit and a pattern detector discriminates validity of each pixel of the stereo image based on the number of local minimum values of non-similarity within a range finally updated within the search range as described above.

Specifically, the repetitive pattern detector 503 performs detection processing of a repetitive pattern described in the first embodiment for each pixel. That is, as described in the first embodiment, the repetitive pattern detector 503 counts the number of local minimum values of non-similarity and searches for the disparity at the same time, updates the predetermined range when the local minimum value of non-similarity becomes out of the predetermined range, and performs detection processing of a repetitive pattern for counting the number of local minimum values of non-similarity within the updated range for each pixel. The repetitive pattern detector 503 adds, to a pixel in which no repetition occurs, validation information indicating that there is no repetition (sets a validation flag).

Next, at Step S203, the edge detector 502 adds, to a pixel having luminance larger than a predetermined threshold, edge information indicating that the pixel corresponds to an edge of the object (sets an edge flag).

Next, at Step S204, the generator 505 as an example of an extractor extracts, as a pixel of valid disparity, a pixel to which both of the validation information and the edge information are added in the entire surface disparity image. That is, the generator 505 extracts the valid disparity based on the pixel for which the validation flag is turned on and the edge flag is turned on in the entire surface disparity image.

FIG. 24 is an extraction result obtained by using a conventional method for extracting the valid disparity. In FIG. 24, a region in which four disparity values of "4" are continuous is a region in which a correct disparity is obtained. A region subsequent thereto in which the disparity values are "10, 10, 22, 22, 22, 22, 22, 22" is a region in which erroneous matching occurs due to an object of repetitive pattern positioned at a long distance. A region subsequent thereto in which seven disparity values of "4" are continuous is a region in which a correct disparity is obtained. In a case of the conventional method for extracting the valid disparity, as illustrated by being surrounded with a thick line frame in FIG. 24, erroneous determination occurs such that a pixel is determined to be a valid pixel although erroneous matching occurs and the disparity values are incorrect.

The generator 505 in the equipment control system according to the first embodiment extracts, as a pixel of valid disparity, the pixel for which the validation flag is turned on and the edge flag is turned on as illustrated in FIG. 25. That is, the generator 505 performs, as it were, processing for inputting the validation flag and the edge flag to an AND gate to obtain an output. Accordingly, as illustrated in FIG. 25, the pixel having the disparity value of "4" in which the validation flag and the edge flag are both "1" is determined to be a valid pixel. The generator 505 also determines, to be a valid pixel, a pixel between the pixels having the disparity value of "4" that have been determined to be valid. In contrast, the pixels in the region in which erroneous matching occurs are all determined to be invalid pixels.

Finally, the generator 505 outputs, to the recognition processor 34 at a rear stage, a disparity image in which the disparity of erroneous matching is reduced (noise is reduced) and many valid disparities are included (Step S205), and ends the processing in the flowchart of FIG. 23.

By reducing the number of such erroneous matching processes and using the disparity image in which valid disparity values are increased in recognition processing, one object can be correctly recognized as one object, object recognition processing can be performed, and correct driving support can be performed.

According to an embodiment of the present invention, a disparity image appropriate for recognizing an object can be generated.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An object recognition device for performing recognition processing on a distance image to recognize an object, the object recognition device comprising:
    determination circuitry configured to determine a valid distance pixel forming the distance image and an invalid distance pixel not forming the distance image, based on a feature value of each pixel in a captured image;
    changing circuitry configured to change the invalid distance pixel near the valid distance pixel to a valid distance pixel; and
    recognition processor configured to perform recognition processing on the distance image formed by the valid distance pixel determined by the determination circuitry and the valid distance pixel obtained by the changing circuitry to recognize the object,
    wherein the distance image is generated from a plurality of captured images captured by a plurality of imaging circuits,
    the object recognition device further comprising:
    calculator circuitry configured to set a valid disparity pair of two adjacent valid disparities out of valid disparities each corresponding to the valid distance pixel in a disparity image, and calculate a positional relation between the valid disparities of the valid disparity pair; and
    validation circuitry configured to validate a disparity between the valid disparity pair when a disparity value of the disparity between the valid disparity pair is within a disparity value range determined in accordance with disparity values of the valid disparity pair,
    wherein:
    the calculator circuitry includes
        search range setting circuitry configured to set a search range of a disparity to be paired with the valid disparity in the same line as a selected pixel in accordance with a valid disparity as a disparity value of the valid distance pixel and pair interval information indicating an actual width of an object to be detected; and
        setting circuitry for a disparity to be paired configured to set the disparity to be paired in the search range; and
        difference detecting circuitry configured to detect a difference between the valid disparity and the disparity to be paired, and
    the validation circuitry validates a disparity between the valid disparity and the disparity to be paired when the difference between the valid disparity and the disparity to be paired is equal to or smaller than a predetermined threshold.

2. The object recognition device according to claim 1, wherein
    the calculator circuitry includes
        pair setting circuitry configured to set, as the valid disparity pair, a disparity of interest out of valid disparities each corresponding to the valid distance pixel and a closest valid disparity in the same line as the disparity of interest; and
        pair position calculator circuitry configured to calculate a positional relation of the valid disparity pair.

3. The object recognition device according to claim 1, wherein the determination circuitry supplies first valid disparity information to the calculator when an edge amount obtained as the feature value from the captured image is larger than a first edge amount threshold, and supplies second valid disparity information to the validation unit when the edge amount obtained as the feature value from the captured image is larger than a second edge amount threshold smaller than the first edge amount threshold, the calculator circuitry sets the valid disparity pair based on the first valid disparity information, and the validation circuitry validates a disparity between the valid disparity pair based on the second valid disparity information.

4. The object recognition device according to claim 1, further comprising:

disparity arithmetic circuitry configured to calculate a disparity value of the captured image through matching processing, wherein the disparity arithmetic circuitry includes:

evaluation value calculator circuitry configured to calculate an evaluation value of correlation within a predetermined search range;

extreme value detector circuitry configured to detect an extreme value of the evaluation value;

counter circuitry configured to count the number of the extreme values having values within a predetermined range; and updater circuitry configured to update the predetermined range when an extreme value representing higher correlation than the value within the range is detected, wherein the counter circuitry counts the number of extreme values within a range finally updated within the search range.

5. The object recognition device according to claim 4, wherein the disparity arithmetic circuitry invalidates a disparity value corresponding to the extreme value within the finally updated range when a count value of the counter circuitry is equal to or larger than a predetermined value.

6. The object recognition device according to claim 4, wherein the disparity arithmetic circuitry includes resetting circuitry configured to reset the counter circuitry.

7. The object recognition device according to claim 4, further comprising:

edge detector circuitry configured to detect an edge of the captured image;

discrimination circuitry configured to discriminate validity of each pixel in the captured image based on the number of extreme values within the range finally updated within the search range; and extractor circuitry configured to extract, as a valid disparity, a disparity value of a pixel that is discriminated to be valid by the discrimination circuitry and detected as the edge by the edge detector circuitry out of pixels in the captured image.

8. The object recognition device according to claim 7, wherein the discrimination circuitry is a pattern detector configured to detect a repetitive pattern using the captured image and discriminate a pixel that is not the repetitive pattern as a valid pixel, and the extractor circuitry extracts, as a valid disparity, a disparity value of the pixel that is not the repetitive pattern and detected as the edge out of pixels in the disparity image.

9. An equipment control system comprising:

the object recognition device according to claim 1; and a control device configured to control a device using an object recognition result of the object recognition device.

10. An object recognition method for performing recognition processing on a distance image to recognize an object, the object recognition method comprising:

determining a valid distance pixel forming the distance image and an invalid distance pixel not forming the distance image, based on a feature value of each pixel in a captured image;

changing the invalid distance pixel near the valid distance pixel to a valid distance pixel; and performing recognition processing on the distance image formed by the valid distance pixel determined at the determining and the valid distance pixel obtained at the changing to recognize the object, wherein the distance image is generated from a plurality of captured images, the object recognition method further comprising:

setting a valid disparity pair of two adjacent valid disparities out of valid disparities each corresponding to the valid distance pixel in a disparity image, and calculating a positional relation between the valid disparities of the valid disparity pair; and validating a disparity between the valid disparity pair when a disparity value of the disparity between the valid disparity pair is within a disparity value range determined in accordance with disparity values of the valid disparity pair, wherein:

the setting the valid disparity pair includes setting a search range of a disparity to be paired with the valid disparity in the same line as a selected pixel in accordance with a valid disparity as a disparity value of the valid distance pixel and pair interval information indicating an actual width of an object to be detected; and setting a disparity to be paired in the search range; and detecting a difference between the valid disparity and the disparity to be paired, and the validating validates a disparity between the valid disparity and the disparity to be paired when the difference between the valid disparity and the disparity to be paired is equal to or smaller than a predetermined threshold.

11. A distance image generation device for outputting a distance image used for recognizing an object to object recognition circuitry that performs recognition processing on the distance image to recognize the object, the distance image generation device comprising:

determination circuitry configured to determine a valid distance pixel forming the distance image and an invalid distance pixel not forming the distance image, based on a feature value of each pixel in a captured image;

changing circuitry configured to change the invalid distance pixel near the valid distance pixel to a valid distance pixel; and generator circuitry configured to generate the distance image formed by the valid distance pixel determined by the determination circuitry and the valid distance pixel obtained by the changing circuitry and output the distance image to the object recognition circuitry, wherein the distance image is generated from a plurality of captured images captured by a plurality of imaging circuits, the distance image generation device further comprising:

calculator circuitry configured to set a valid disparity pair of two adjacent valid disparities out of valid disparities each corresponding to the valid distance pixel in a disparity image, and calculate a positional relation between the valid disparities of the valid disparity pair; and validation circuitry configured to validate a disparity between the valid disparity pair when a disparity value of the disparity between the valid disparity pair is within a disparity value range determined in accordance with disparity values of the valid disparity pair, wherein:

the calculator circuitry includes search range setting circuitry configured to set a search range of a disparity to be paired with the valid disparity in the same line as a selected pixel in accordance with a valid disparity as a disparity value of the valid distance pixel and pair interval information indicating an actual width of an object to be detected; and setting circuitry for a disparity to be paired configured to set the disparity to be paired in the search range; and difference detecting circuitry configured to detect a difference between the valid disparity and the disparity to be paired, and the validation circuitry validates a disparity between the valid disparity and the disparity to be paired when the difference between the valid disparity and the disparity to be paired is equal to or smaller than a predetermined threshold.

12. The method according to claim 10, wherein the setting the valid disparity pair includes:

setting, as the valid disparity pair, a disparity of interest out of valid disparities each corresponding to the valid distance pixel and a closest valid disparity in the same line as the disparity of interest; and calculating a positional relation of the valid disparity pair.

13. The method according to claim 10, wherein:

the determining the valid distance pixel supplies first valid disparity information to the calculator when an edge amount obtained as the feature value from the captured image is larger than a first edge amount threshold, and supplies second valid disparity information to the validation unit when the edge amount obtained as the feature value from the captured image is larger than a second edge amount threshold smaller than the first edge amount threshold, setting the valid disparity pair sets the valid disparity pair based on the first valid disparity information, and the validating validates a disparity between the valid disparity pair based on the second valid disparity information.

14. The method according to claim 10, further comprising calculating a disparity value of the captured image through matching processing, including:

calculating an evaluation value of correlation within a predetermined search range;

detecting an extreme value of the evaluation value;

counting the number of the extreme values having values within a predetermined range; and updating the predetermined range when an extreme value representing higher correlation than the value within the range is detected, wherein the counting counts the number of extreme values within a range finally updated within the search range.

15. The method according to claim 14, wherein the calculating the disparity value invalidates a disparity value corresponding to the extreme value within the finally updated range when a count value of the counting is equal to or larger than a predetermined value.

16. The method according to claim 14, further comprising:

resetting the counting.

17. The method according to claim 14, further comprising:

detecting an edge of the captured image;

discriminating validity of each pixel in the captured image based on the number of extreme values within the range finally updated within the search range; and extracting, as a valid disparity, a disparity value of a pixel that is discriminated to be valid by the discriminating and detected as the edge by the detecting the edge out of pixels in the captured image.

18. The method according to claim 17, wherein the discriminating detects a repetitive pattern using the captured image and discriminates a pixel that is not the repetitive pattern as a valid pixel, and the extracting extracts, as a valid disparity, a disparity value of the pixel that is not the repetitive pattern and detected as the edge out of pixels in the disparity image.

19. The device according to claim 11, wherein the calculator circuitry includes pair setting circuitry configured to set, as the valid disparity pair, a disparity of interest out of valid disparities each corresponding to the valid distance pixel and a closest valid disparity in the same line as the disparity of interest; and pair position calculator circuitry configured to calculate a positional relation of the valid disparity pair.

20. The device according to claim 11, wherein the determination circuitry supplies first valid disparity information to the calculator when an edge amount obtained as the feature value from the captured image is larger than a first edge amount threshold, and supplies second valid disparity information to the validation unit when the edge amount obtained as the feature value from the captured image is larger than a second edge amount threshold smaller than the first edge amount threshold, the calculator circuitry sets the valid disparity pair based on the first valid disparity information, and the validation circuitry validates a disparity between the valid disparity pair based on the second valid disparity information.

* * * * *